US006678473B1

(12) United States Patent
Morthier

(10) Patent No.: US 6,678,473 B1
(45) Date of Patent: Jan. 13, 2004

(54) CROSS-CONNECT DEVICE AND A METHOD FOR SWITCHING USING SPACE SWITCHING AND GROUPING OF CHANNELS

(75) Inventor: Geert Morthier, Ghent (BE)

(73) Assignees: Interuniversitair Microelektronica Centrum (IMEC) (BE); RIJSUniversiteit Gent (BZ)

( * ) Notice: Subject to any disclaimer, the term of this patent is extended or adjusted under 35 U.S.C. 154(b) by 0 days.

(21) Appl. No.: 09/464,652

(22) Filed: Dec. 15, 1999

(30) Foreign Application Priority Data

Jan. 27, 1999 (EP) .............................................. 99200252

(51) Int. Cl.$^7$ ............................................... H04J 14/00
(52) U.S. Cl. ............................................ 398/56; 398/50
(58) Field of Search ................................. 359/117, 128, 359/139; 398/56, 82, 50

(56) References Cited

U.S. PATENT DOCUMENTS

| | | | | |
|---|---|---|---|---|
| 5,457,556 A | * | 10/1995 | Shiragaki | 359/117 |
| 5,712,932 A | * | 1/1998 | Alexander et al. | 359/127 |
| 5,889,600 A | * | 3/1999 | McGuire | 359/121 |
| 5,953,141 A | * | 9/1999 | Liu et al. | 359/124 |
| 6,067,389 A | * | 5/2000 | Fatehi et al. | 385/17 |
| 6,195,187 B1 | * | 2/2001 | Soref et al. | 359/114 |

FOREIGN PATENT DOCUMENTS

| EP | 083918 A1 | 4/1998 | ............ H04J/14/02 |
|---|---|---|---|

OTHER PUBLICATIONS

Harold G. Edwards, "*Optical Network Testbed Moves WDM Into the Field*", Laser Focus World, vol. 32, No. 9, Sep. 1996, pp. 129–132, 134, Fig. 2.

Article by Charles A. Brackett, Anthony S. Acampora, John Sweitzer, Gregory Tangonan, Mark T. Smith, William Lennon, Keh–Chung Wang and Robert H. Hobbs, A *Scalable Multiwavelength Multihop Optical Network: A Proposal for Research on All–Optical Networks*, IEEE Journal of Lightwave Technology, vol. 11, NO. 5/6, May/Jun. 1993.

Article by Michael S. Borells, Jason P. Jue, Dhritiman Banerjee, Byrav Ramamurthy and Biswanath Mukherjee, *Optical Components for WDM Lightwave Networks*, Proceedings of the IEEE, vol. 85, No. 8, Aug. 1997.

Article by Eugenio Iannone and Roberto Sabella, *Optical Path Technologies: A Comparison Among Different Cross–Connect Architectures*, IEEE Journal of Lightwave Technology, vol. 14, No. 10, Oct. 1996.

Article by Jingyu Zhou, Roberto Cadeddu, Emilio Casaccia, Carlo Cavazzoni and Michael J. O'Mahony, *Crosstalk in Multiwavelength Optical Cross–Connect Networks*, IEEE Journal of Lightwave Technology, vol. 14, No. 6, Jun. 1996.

* cited by examiner

*Primary Examiner*—Leslie Pascal
*Assistant Examiner*—Shi K. Li
(74) *Attorney, Agent, or Firm*—Jones Day

(57) ABSTRACT

The present invention provides a cross-connect switching device and a method of cross-connect switching of $N_f * N_1$ channels to one of a plurality of output lines of the switching device, $N_f * N_1$ being equal or greater than four. The device and method includes three basic elements:

1) a partial demultiplexer for partially demultiplexing the channels on its input lines into groups of channels and individual channels;

2) a space switch for switching groups of channels en bloc; and 3) a combiner unit for combining individual channels onto one of the output lines of the cross-connect switching device.

The cross-connect switching device according to the present invention may be combined with similar or dissimilar switching devices to form a larger switching device.

30 Claims, 12 Drawing Sheets

US 6,678,473 B1

CROSS-CONNECT DEVICE AND A METHOD FOR SWITCHING USING SPACE SWITCHING AND GROUPING OF CHANNELS

CROSS-REFERENCES TO RELATED APPLICATION

This application claims priority from the following applications:

International Application No.: EP992002527, filed Jan. 27, 1999.

BACKGROUND OF THE INVENTION

1. Field of the Invention

The present invention relates to methods and apparatus for a general cross-connect switching device and more particularly to a general switching method for the cross-connecting of an arbitrary number of communication lines, e.g. optical fibers, carrying an arbitrary number of channels.

2. Description of Related art Including Information Disclosed Under 37 CFR 1.97 AND 1.98

According to an article by C. A. Brackett, A. S. Acampora, J. Sweitzer, G. Tangoman, M. T. Smith, W. Lennon, K. Wang, and R. H. Hobbs, entitled "A Scalable Multiwavelength Multihop Optical Network: A Proposal for Research on All-Optical Networks" IEEE Journ. Lightw. Techn., Vol. 11, pp.736–753, 1993, several signals are transmitted simultaneously over a single optical fiber by multiplexing the different signals on different carrier wavelengths referred to as "Wavelength Division Multiplexing" (WDM).

WDM networks consist of different WDM optical connections, each of which consists of several fibers carrying WDM signals, and of optical cross-connects to switch between the different links. An example is schematically shown in prior art FIG. 1. The lines all represent optical waveguides, often fibers, with WDM signals. The optical cross-connects (OXC) preferably have the following functionality:

individual channels from each fiber can be dropped (for use in a local access network e.g.), individual channels (coming from the local access network) can be added to each fiber, individual channels from each fiber can be switched to any other fiber.

Different wavelength channels from one fiber may be switched to different output fibers. In some cases, one also requires that the individual channels can be converted in wavelength so that wavelength contention can be avoided if two channels with equal wavelength have to be switched to the same output fiber.

A typical architecture of an optical cross-connect, with $N_f$ incoming fibers and $N_f$ outgoing fibers, is depicted in prior art FIGS. 2A and 2B. Reference is made to M. S. Borella et al., "Optical Components for WDM Lightwave Networks", Proc. of the IEEE, Vol. 85, pp. 1274–1307, 1997, E. Iannone, R. Sabella, "Optical Path Technologies: A Comparison Among Different Cross-Connect Architectures", IEEE Journ. Lightw. Techn., Vol. 14, pp. 2184–2196, 1996 and J. Zhou et al., "Crosstalk in Multiwavelength Optical Cross-Connect Networks", IEEE Journ. Lightw. Techn., Vol. 14, pp. 1423–1435, 1996. The cross-connecting functionality is achieved by first demultiplexing signals on the incoming fibers into the individual channels, by subsequently space switching all the individual wavelength channels, possibly followed by wavelength conversion (FIG. 2B) and by finally multiplexing or recombining the switched individual channels. Different variations of this architecture have been proposed in the literature. However, they all more or less are based on the same principle and they all require an N-dimensional space switch, with N being the product of the number of incoming and outgoing fibers and the number of wavelength channels per fiber. For example, a cross-connect device may be provided wherein all fibers are first demultiplexed before switching.

In most of the optical cross-connects of the type shown in FIGS. 2A and 2B, the optical filters can have a fixed wavelength dependence. There are then $N_f \times N_1$ such filters, with $N_f$ being the number of input and output fibers and $N_1$ the number of wavelength channels per fiber. Furthermore, if full connectivity is required (i.e., it must be possible to connect two channels with equal wavelength from different input fibers to the same output fiber by making use of wavelength conversion), a total of $N_f(N_f-1) \times (N_1)^2/2$ elementary 2×2-switches are required. An alternative, however, is to use tuneable optical filters (which can filter any of the wavelength channels), in which case only $N_f(N_f-1) \times (N_1)/2$ elementary 2×2-switches are required. If no wavelength conversion is used and only connections between the different fibers are needed for the individual channels (meaning that for each individual channel at the input a connection with all output fibers is necessary), then $N_f(N_f-1) \times (N_1)/2$ elementary 2×2-switches are required.

The main drawback of conventional cross-connect devices is the number of components (filters, switches) needed.

A cross-connect device with $N_f$ input fibers and $N_f$ output fibers, where $N_f$ is an even number can be built as a combination of smaller cross-connects with two input and two output fibers. This is illustrated in prior art FIG. 3 for the case of four input and four output fibers. In this figure, OXC-2,$2^M$) stands for an optical cross-connect with two input and two output fibers, with each fiber carrying $2^M$ wavelength channels. The notation 2×2 OXC represents an optical cross-connect device with two input and two output fibers.

It should be emphasized that the discussion above is not limited to optical systems. Switching in electrical communication systems exploiting frequency division multiplexing (FDM) shows the same characteristics. Frequency channels in electrical communications are equivalent in this respect to wavelength channels in optical systems.

Therefore, it is an object of the invention to provide cross-connect devices and methods comprising less components than presently available devices.

Another object of the present invention is to provide a cross-connect switch and a method of operating the same which provides full connectivity while reducing the cost of the device.

SUMMARY OF THE INVENTION

The present invention is a cross-connect switching device for use with all types of communication systems including optical and for receiving a multiplicity of input and output line $N_f$ with reach input and output line carrying $N_1$ channels. The cross-connect switching device of this invention is capable of switching any one of the $N_f \times N_1$ input lines to any one of the $N_f \times N_1$ output lines with $N_f \times N_1$ being equal to or greater than four (4) and where the channels are equally distributed over the input lines.

The invention comprises a switch which is connected to selected ones of the input lines of the cross-connect switching device and which is adapted to switch a channel group or group of channels on one input line of the switch as a block or group to one of the output lines. A channel group is defined as a plurality of channels up to a maximum of $N_1$ channels.

There is also included a partial demultiplexer which is also connected to the switch which relates at least one individual channel from one of the channel groups, and a combiner unit for combining the selected individual channels onto an output line of the cross-connect switching device.

Additional channel groups may be generated by including another switch connected between the partial demultiplexer and the combiner unit which receives the output of the partial demultiplexer and switches an additional channel group as a block towards another one of the output lines of the cross-connect switching device.

BRIEF DESCRIPTION OF THE DRAWINGS

These and other features of the present invention will be more fully disclosed when taken in conjunction with the following Detailed Description of the Invention in which like numerals represent like elements and in which:

FIG. 2A is without wavelength conversion and FIG. 2B is with wavelength conversion;

FIG. 9A shows four (4) channels per fiber and FIG. 9B shows seven (7) channels per fiber;

DETAILED DESCRIPTION OF THE INVENTION

Figure 1:
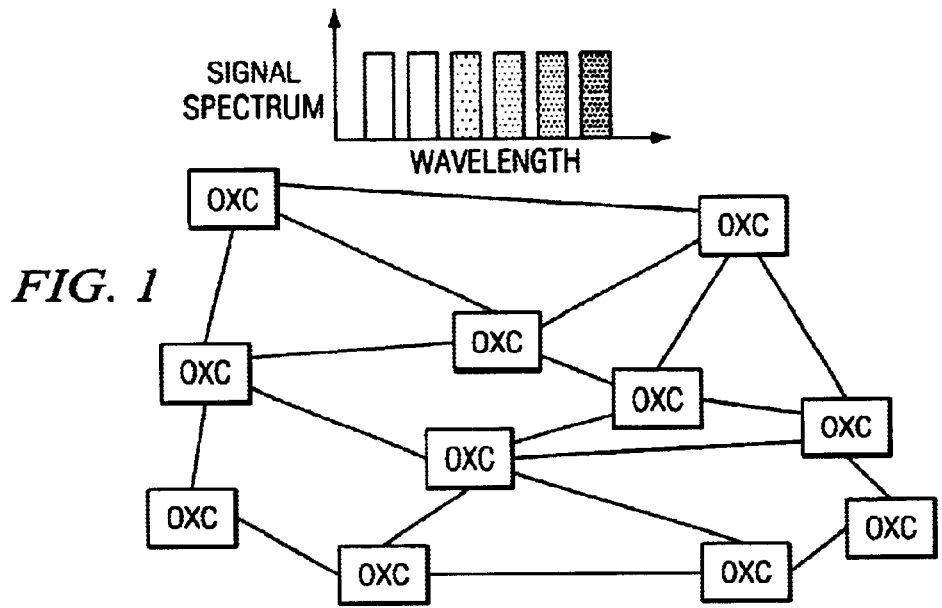
FIG. 1 is a schematic representation of a prior art cross-connected WDM optical network.
Figure 2A:
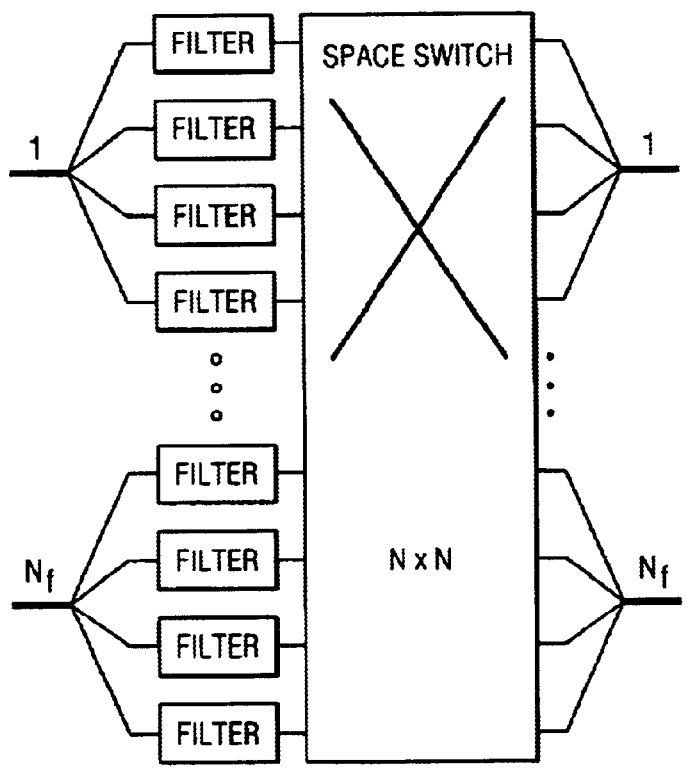
FIGS. 2A and 2B show typical prior art architecture of a conventional optical cross-connect.
Figure 2B:
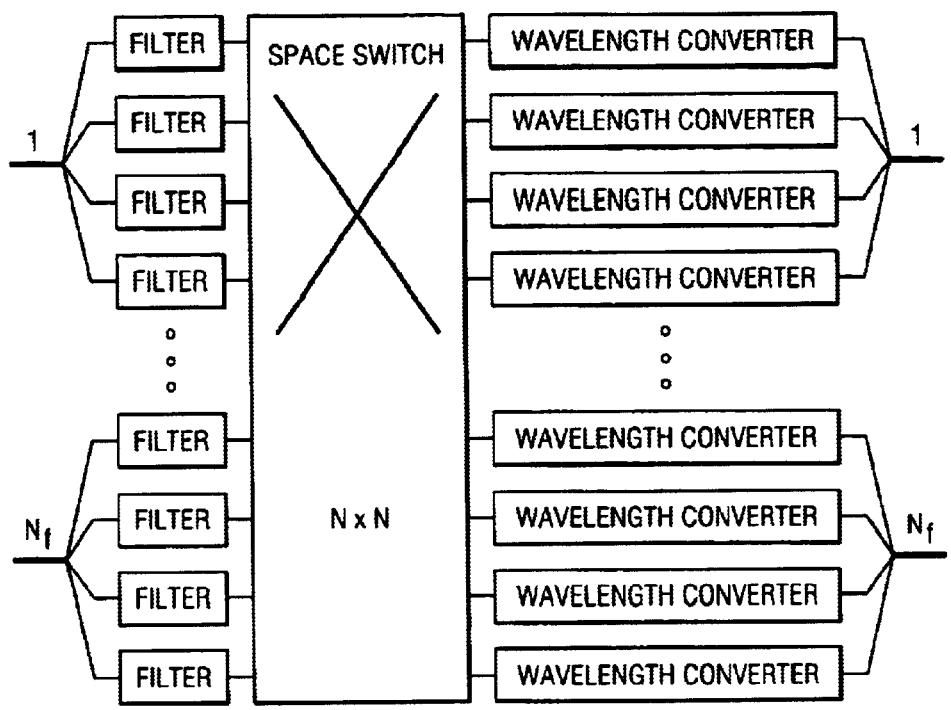

The present invention is described with reference to various embodiments described by the drawings. However, it is not intended that the present invention be limited to such described embodiments but only by the claims. Further, the present invention will be described with reference to optical cross-connect devices but the present invention is not limited thereto, and may find general use in a cross-connect device and in a switching method for cross-connecting of an arbitrary number of input communication lines each carrying an arbitrary number of channels. For example, the present invention may find advantageous use in a cross-connect for cable communication lines, e.g. coax cables, or for hydraulic logic circuits. Further, reference is made to tuneable filters and to switches. The cross-connect switching devices in accordance with any of the embodiments of the present invention may include the necessary devices for selectably changing the tuning of the tuneable filters or for selectably activating switching of the switches.

In the description of the invention and in the claims the word "line" is used as general definition for transmission media such as an optical fiber or fibers or other waveguides for optical communication, or electrical cables such as coax cables for electrical communication. A channel is associated with an identified portion of an interface, and is generally defined in terms of its transmission support and not by the information carried. The most elemental form of channel is the lowest unit of transmission support which is capable of transmitting at least a part of a communication between parts of a telecommunications network. Channels may be organized in a hierarchy, e.g. channels may be multiplexed into a time division multiplexed system so that there are several elemental channels being carried in a time spaced way on a channel one level higher in the hierarchy. In accordance with the present invention various types of channels are described. A high level communication channel may transmit many different communications each of which is carried on its own channel. To provide separation and isolation (sometimes known as orthogonality) between concurrent communications, various methods are used. A time division channel is a transmission support unit which is isolated from other such units which might interfere with it by the individual communications being isolated in time, e.g. each user obtains a time slot in a frame. A coded channel is a transmission support unit which is isolated from other such units which might interfere with it by being coded with a special code. An example of such a channel is a user channel in a direct sequence spread spectrum system, e.g. with Code Division Multiple Access (CDMA). A frequency or wavelength channel is a transmission support unit which is isolated from other such units which might interfere with it by being confined to a specific frequency or frequency band (wavelength or wavelength band). Along one frequency channel, several orthogonal communications may be sent. For instance, several coded channels or several time division channels may be operated within a frequency channel. In more complex systems, a hierarchical channel organization may include a plurality of frequency channels, each frequency channel supporting several time division channels, each of which supports several coded channels, etc. This generates a hierarchy of channels at different levels which use different methods of obtaining isolation from other channels.

In accordance with the present invention the term demultiplexing is used to refer to a process whereby a plurality of concurrently transmitted communications on a communication line are separated into the transmission support units of the lowest level in any hierarchy, i.e. into elemental transmission support units or elemental channels. Hence, time demultiplexing is the separation of a serial stream of time division channels into the individual channels, each separated channel or channels being associated with one time slot. Code demultiplexing is the separation of several concurrently transmitted differently coded communications into the individual channels, each separated channel or channels only having one code. Frequency demultiplexing is the separation of several concurrently transmitted communications at different frequencies or in different frequency bands into the individual channels, each separated channel or channels being at one frequency or on one frequency band. Multiplexing is the reverse of any of these demultiplexing procedures. Alternative words for switching are routing or connecting.

In accordance with the present invention "partial demultiplexing" refers to a process whereby a plurality of concurrently transmitted communications on a communication line are separated into transmission support units of which some have a higher level than the lowest level in any hierarchy, i.e. not completely into elemental transmission support units or elemental channels. The result of partial demultiplexing is, in accordance with one aspect of the present invention, a process whereby a plurality of concurrently transmitted communications on a communication line are separated into a group or groups of elemental support units on one or more communication lines and an individual elemental support unit or support units on a communication line.

In a first embodiment of the invention a cross-connect switching device with $N_f$ input fibers and $N_f$ output fibers, each fiber carrying $N_1$ channels is provided. The input fibers carry the same amount of channels $N_1$, thus the channels are equally distributed over the input fibers. The output fibers carry the same amount of channels as the input fibers. An aspect of the cross-connect switching device according to the first embodiment is that it comprises a switching unit for switching a group of channels which are a subset of the channels to be switched by the cross-connect switching device. An aspect of this first embodiment is that the switching unit may have the same structure as the cross-connect switching device itself.

The cross-connect switching device according to this embodiment is able to switch all the channels, i.e. the amount of channels per input fiber multiplied by the amount of input fibers, thus $N_f * N_1$. "Switching" means that any one input channel can be connected to any one of the output fibers of device. Each of the output fibers has a fixed number of channels such that wavelength conversion may be required in the device if input channels having the same wavelengths are to be connected to the same output fiber.

The cross-connect switching device according to this embodiment may comprise the following components: (1) a space switch with $N_f$ input fibers and $N_f$ output fibers, (2) $N_f$ splitters, each having one input fiber and a plurality of output fibers, (3) a switching unit with $N_f$ input fibers and $N_f$ output fibers able to switch an amount of channels strictly smaller than $N_f * N_1$, (4) a plurality of filters, each having one input fiber and one output fiber, (5) $N_f$ combiners, each having a plurality of input fibers and one output fiber.

The inputs of the cross-connect switching device according to this embodiment are the inputs to the switch while the outputs of the device are the outputs of the combiners. Moreover the splitters are applied to the output fibers of the switch, meaning that a splitter is connected to each of the outputs. At least part of the output fibers of the switch are connected to filters. The switching unit can switch less channels than the cross-connect device itself and moreover the channels, switched by the switching unit, are a subset of the channels on the outputs of the switch. The channels of the switch are connected to the inputs of the switching unit via the splitters.

Hence, the present invention includes a cross-connect switching device with $N_f$ input lines and $N_1$ output lines and $N_1$ channels per line and the capability to switch any of the $N_f * N_1$ input channels to one of the output lines. $N_f * N_1$ being equal or greater than four (4), and the channels being equally distributed over the input lines, comprising:

a switch being operatively connected to at least some of the input lines of the cross-connect switching device and being adapted to switch at least one (1) channel group on one input line of the switch en bloc to an output line of the switch, a channel group including a plurality of channels up to a maximum of $N_1$ channels;

a partial demultiplexer operatively connected to the switch for selecting at least one individual channel from at least one (1) channel group; and a combiner unit for combining the selected individual channel onto an output line.

The present invention also includes a cross-connect switching device with $N_f$ input lines and $N_f$ output lines and $N_1$ channels per line, and the capability to switch any of the $N_f * N_1$ input channels to one of the output lines. $N_f * N_1$ being equal or greater than four (4), and the channels being equally distributed over the input lines, comprising:

a partial demultiplexer operatively connected to at least some of the input lines of the cross-connect switching device for partial demultiplexing the channels on an input line of the partial demultiplexer into at least a group of channels and an individual channel, a channel group including a plurality of channels up to a maximum of $N_1$ channels;

a switch operatively connected to the output side of the partial demultiplexer, the switch being adapted to switch the at least one (1) channel group en bloc to an output line of the switch; and a combiner unit for combining the individual channel onto an output line.

The switching operation may include progressive serial space switching and the switch may include a series of space switches. Each space switch may be associated with a partial demultiplexer so that at each stage of the series, a group of channels is switched en bloc towards the relevant output fiber and certain of the channels of the group are demultiplexed, i.e selected from the group and transmitted towards the relevant output fiber.

Alternatively, the channel groups may first be formed by demultiplexing all the input channels and regrouping these channels into groups which may include a single channel or a plurality of channels. The single channels and groups may then be switched en bloc towards the relevant output line using parallely arranged space switches. Finally, the switched groups and single channels are combined onto the output channels. To avoid wavelength conflicts, the channels may be wavelength converted in wavelength converters, one per channel after the demultiplexing step.

The present invention also includes a cross-connect switching device with $N_f$ input fibers and $N_f$ output fibers, and the capability to switch $N_f * N_1$ channels. $N_f * N_1$ being equal or greater than four (4), and the channels being equally distributed over the input fibers, comprising:

a switch with $N_f$ input fibers and $N_f$ output fibers, the input fibers of the switch being the input fibers of the cross-connect switching device, and the switch switching for each of the input fibers of the switch all channels towards one (1) of the output fibers of the switch;

$N_f$ splitters, each having one (1) input fiber and a plurality of output fibers, and the input fiber being one (1) of the output fibers of the switch;

a switching unit with $N_f$ input fibers and $N_f$ output fibers, being able to switch a first number of channels, the first number being smaller than $N_f * N_1$, and the first number of channels being a subset of the channels on the output fibers of the switch;

a plurality of filters, each having one (1) input fiber and one (1) output fiber, and part of the filters being applied to part of the plurality of output fibers of the splitters; and a plurality of combiners, each having a plurality of input fibers and one (1) output fiber, the output fibers of the combiners being the output fibers of the cross-connect device, each of the combiners combining the channels on a subset of the output fibers of the splitters onto one (1) of the output fibers of the component.

The switching unit may also be referred to as a selecting and switching device. The selecting and switching device switches a subset of the channels on the outputs of the previous switch. A splitter is connected in between the switch and the selecting and switching device. The inputs of the selecting and swithing device may carry all channels but the selecting and switching device can only switch a subset of these channels. Hence, this device includes a selecting means for selecting the channels that are to be switched. Note also that although combiners combine subsets of the outputs of the splitters, filters can be placed in between.

An aspect of this first embodiment of the invention is that there is a maximum number of channels D to be split off per fiber. The maximum number D equals the first integer larger than or equal to $[N_1/2(N_f-1)]$ with $N_1$ the amount of channels per fiber and $N_f$ the amount of fibers. The designer can choose to split off a number of channels E, where E is at least one (1) channel per fiber and maximally D channels per fiber. The amount of channels that remain to be switched by the switching unit is $N_f *( N_1-E)$.

An aspect of the first embodiment is the connections made between the components of the device: (1) each of the output fibers of the switch are connected to one of the input fibers of the splitters, (2) each of the input fibers of the switching unit are connected to one of the output fibers of one of the splitters, whereby the input fibers of the switching unit are not connected to the same splitter, (3) each of the input fibers of the filters are connected to one of the output fibers of one of the splitters, (4) each of the output fibers of the switching unit are connected to one of the input fibers of the combiners, whereby the output fibers of the switching unit are not connected to the same combiner, (5) each of the output fibers of the filters are connected to one of the input fibers of the combiners.

By connection between two components is meant that one side of a connection is attached to the input fiber of one component and the other side of the connection is attached to the output fiber of a second component. An input or an output fiber can only be connected once. Although the connection pattern described above incorporates various connection possibilities, the condition of only connecting once must always be satisfied. The fiber for connecting an input fiber with an output fiber can also contain an optical amplifier.

An aspect of this first embodiment is that the cross-connect switching device is to be able to switch $2^N+2*M$ channels with N an integer strictly greater than one (1), $2*M$ being an integer larger or equal to zero (0) and smaller than $2^N$, with M an integer. The factor two (2) is due to the fact that two (2) input fibers are considered. The amount of channels per fiber can be a power of two $2^{N-1}$ with M=0) or any positive integer number ($2^{N-1}+M$). The minimal amount of channels to be switched with said device is four (4).

The cross-connect switching device according to the invention may be characterized by a few numbers. A first number A is defined as the largest integer smaller than $2^{N-2}+M/2$. A second number B is defined as an integer larger or equal to said first number A and smaller than $2^{N-1}+M$. A third number C is defined as the difference between $2^{N-1}+M$ and said second number B. Note that the selection of the second number B results in some design freedom. The device will be constructed such that it is comprised of some standard components (such as switches, filters, splitters and combiners) and another component for switching channels. The switching unit also has two (2) input fibers and two (2) output fibers. The first number A depicts the lower bound for the amount of channels carried by the input fibers of the switching unit. Note that the first number A equals the amount of channels to be switched by the architecture under construction divided by four (4). This factor four is due to the fact that the channels per input fiber are considered (first division by two(2)) and that the input fibers of the switching unit are expected to have half as many channels to be switched (second division by two (2)). Naturally the number of channels must be an integer, which explains the additional constraint in the definition of the first number A. Note that the switching unit can be of a lower complexity as only half as much channels must be switched. The amount of channels to be actually switched by the switching unit is depicted by the second number B which is lower bounded (equal or larger than) by the first number A and upper bounded (smaller than) by the amount of channels, carried by the amount of channels of the input fibers of the device under construction (all of the channels divided by two (2)). The condition smaller than is trivial as the component must be less complex than the device under construction.

An aspect of this first embodiment is that the splitters each have one input fiber and an amount of C+1 output fibers. The switching unit is able to switch $2*B$ channels, and the cross-connect switching device has $2*C$ filters, each having one (1) input fiber and one (1) output fiber. The two (2) combiners each have C+1 input fibers and one (1) output fiber.

In the above device, filters with one (1) input fiber and one (1) output fiber are considered. In practice filters can have more than one (1) output fiber, e.g. one (1) output fiber may contain the selected channel while another output fiber contains the complement of this channel. Such filters can also be used in the device defined above. The single output fiber of the filter is then the output fiber containing the selected channel.

A further aspect of this embodiment is that the switching unit in the cross-connect switching device is constructed in the same way as the device itself but designed to switch less channels per fiber. The number and type of components used to construct the switching unit in this way is adapted to the number of channels that are to be switched. This use of a further smaller cross-connect switching device within a cross-connect switching device is described as progressive serial switching in accordance with the present invention. In particular where the first switch is a space switch, this construction principle for a cross-connect switching device in accordance with the present invention will be referred to as progressive serial space switching. Progressive serial space switching can be repeated for all the switching units in the design until a final switching unit is used to terminate the cascade, this last switching unit being able to switch a predetermined number of channels.

Note that recursively applying the same design results in a sequence of components of a first kind. The component of a second kind, which can switch a predetermined number of channels, can then be a full-wired component. The predetermined number of channels is at least equal to $N_f$ or thus one (1) channel per fiber.

In summary this aspect of the embodiment can be stated as follows: A cross-connect switching device wherein the switching unit is further a part of a sequence of serially connected switching units of a first kind. The series being terminated by a switching unit of a second kind which is able to switch a predetermined number of channels. The number of channels being an even integer greater than $N_f$. The switching units can also be denoted selecting and switching devices.

Note that the filters used in this embodiment of the invention can be either tuneable or fixed. The filters can also be combination of a filter and a wavelength converter. Moreover, it can be that part of the filters are combinations of a filter and a wavelength converter and another part just tuneable filters.

A second embodiment of the invention includes a method for switching $N_f * N_1$ channels, being equally distributed over $N_f$ input lines, to $N_f * N_1$ channels. These channels are equally distributed over $N_f$ output lines, with $N_1$ channels per line. The method comprising the step of using a combination of the following steps:

a) performing at least one (1) switching operation in which at least one (1) channel group is switched en bloc towards one (1) of the output lines, a channel group including a plurality of channels up to a maximum of $N_1$ channels;

b) partially demultiplexing to select at least one (1) individual channel from at least one (1) group, and c) combining the selected individual channel onto an output line.

The second embodiment also includes a method for switching $N_f * N_1$ channels which are equally distributed over $N_f$ input lines. There are $N_f * N_1$ channels equally distributed over $N_f$ output lines. The method comprising the step of using a combination of the following steps:

a) partially demultiplexing the channels on an input line into at least one (1) individual channel and at least one (1) group of channels, a channel group including a plurality of channels up to a maximum of $N_1$ channels;

b) performing at least one (1) switching operation in which the at least one (1) channel group is switched en bloc towards one (1) of the output lines; and c) combining the at least one (1) individual channel onto an output line.

The method can for instance be implemented with the device described in the previously discussed embodiment of the invention. An aspect of this second embodiment is that the group switching operation includes progressive serial space switching. An alternative aspect of the second embodiment is that the group switching includes parallel space switching.

In an aspect of the second embodiment of the present invention a method for switching $N_f * N_1$ channels. The inputs are equally distributed over $N_f$ input fibers, (i.e. $N_f * N_1$ channels). The outputs are also equally distributed over $N_f$ output fibers. The method comprises a finite sequence of space switching steps and thereafter a switching and selecting step, for switching an amount of channels equal to $N_f$ multiplied with a number less than $N_1$. "A space switching step" means that the channels carried by an input fiber used in the step are all switched to the same output fiber, used in the step. "A selecting and switching step" means that in the step channels are selected from any of the fibers used as an input in the step, and channels are selected, and the selected channels can be switched to any of the output fibers, used in the step. Note that a space switching step can be performed by a switch while a selecting and switching step can be performed by a selecting and switching device.

Another embodiment of the invention is to present a cross-connect switching device of a first kind having $N_f$ input fibers and $N_f$ output fibers. The input fibers each carry the same amount of channels $N_1$. Also the output fibers each carry $N_1$ channels.

Figure 3:
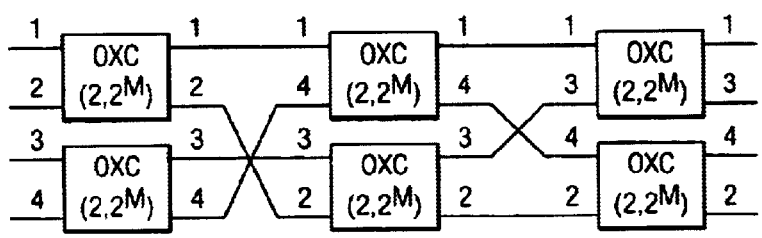
FIG. 3 shows a conventional prior art optical cross-connect with four (4) input and four (4) output fibers built as a combination of six (6) optical cross-connects with two (2) input and two (2) output fibers.
Figure 13:
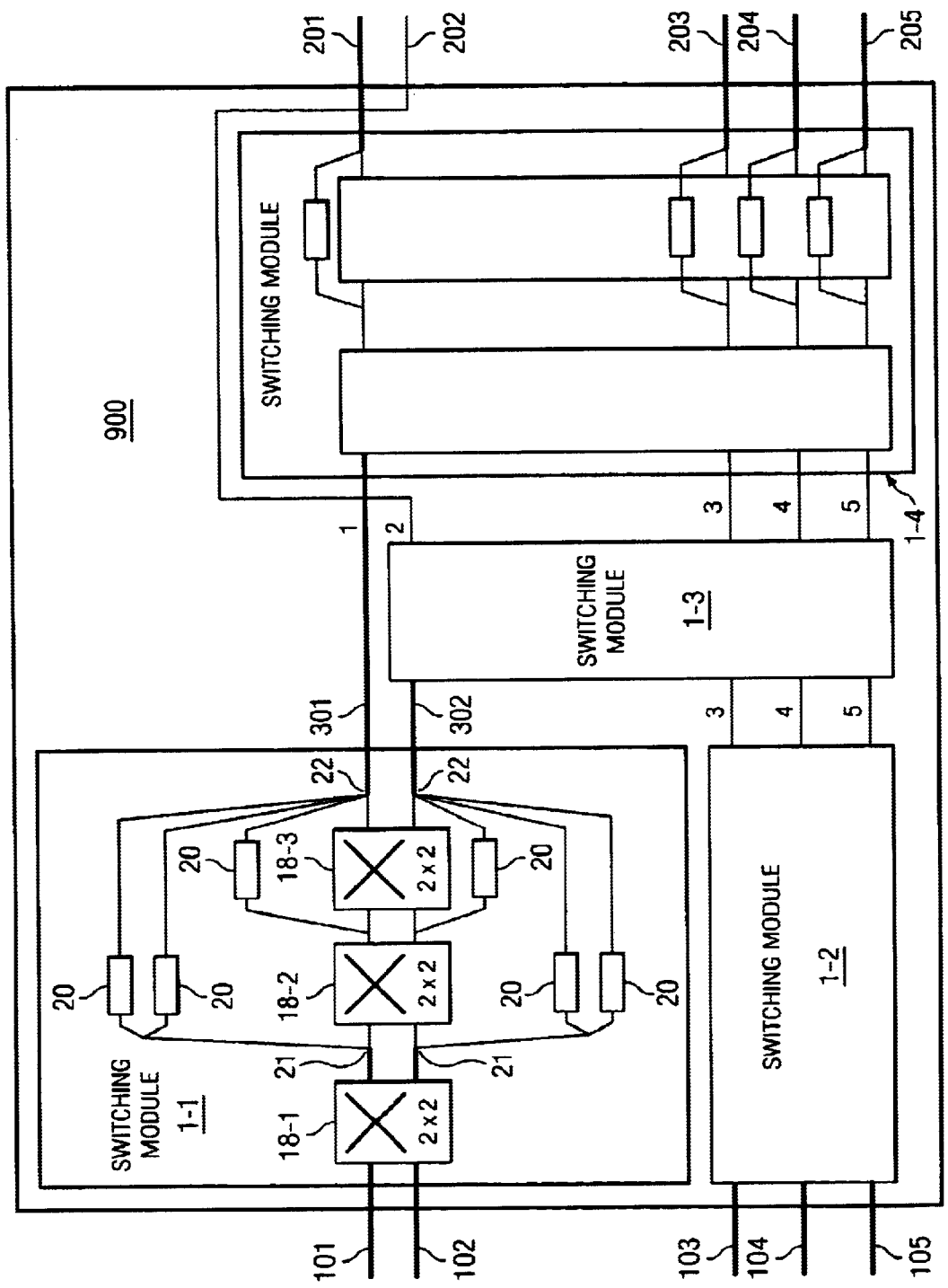
FIG. 13 is a schematic representation of a cross-connect switching device in accordance with an embodiment of the present invention with $N_f$ input and output fibers build up from a number of cross-connect devices with less input and output fibers.

The cross-connect switching device of a first kind is comprised of a plurality of cross-connect switching devices of a second kind, each of the cross-connect switching devices of the second kind having a number of input fibers and output fibers which is less than the cross-connect switching device of the first kind. Note that each of the cross-connect switching devices of the second kind can have a different amount of input/output fibers. Examples of such cross-connect devices are depicted in FIG. 3 which shows a cross-connect device of a first kind with four (4) input fibers and four (4) output fibers comprising of cross-connect devices of a second kind with two (2) input fibers and two (2) output fibers. FIG. 13 shows a cross-connect device of a first kind with five (5) input fibers and five (5) output fibers comprising cross-connect devices of a second kind with different amount of input/output fibers. More specifically with two (2) input and two (2) output fibers, one with three (3) input and three (3) output fibers and two with four (4) input and four (4) output fibers.

At least one (1) of the cross-connect switching devices of a second kind may be constructed by using the progressive serial space switching method described above. Thus at least one (1) of the cross-connect devices of a second kind at least comprises a plurality of switches and a selecting and switching unit.

The selecting and switching unit has an number of input fibers and output fibers equal to the number of input fibers and output fibers of the cross-connect switching device of a second kind to which the selecting and switching unit is a part. In addition, the selecting and switching unit, is able to switch an amount of channels equal to the amount of input fibers of the selecting and switching unit multiplied with a number less than $N_1$. Note that the amount of switches and the amount of channels being switched by the selecting and switching unit can differ in each of the cross-connect devices of a second kind.

The cross-connect devices of a second kind can further comprise filters for selecting channels, splitters for duplicating channels on filters and combiners for combining or multiplexing the switched and/or selected channels onto output fibers.

In an aspect of this third embodiment each of the input fibers of the cross-connect switching device of a first kind are routed through at least one (1) of the. cross-connect switching devices of a second kind. Indeed when full connectivity is required one must have the ability to switch each channel of a certain input fiber to any one (1) output fiber. Routing of the fiber means that when the cross-connect devices of a second kind are all connected, there must exist a path from each input fiber of the cross-connect device of a first kind to any output fibers of the cross-connect device of a first kind via one (1) of the switching devices of a second kind. With connecting cross-connect devices of a second kind is meant that all input fibers of each of the devices of a second kind are connected to an output of one of the devices of a second kind or is defined to be the input of the device of a first kind, and all output fibers of each of the devices of a second kind are connected to an input fiber of one of the devices of a second kind or is defined to be the output of the device of a first kind.

In an embodiment of the invention a cross-connect device with two (2) input and two (2) output fibers and a method of cross-connect switching based on serial space switching is described, with each fiber carrying $N_1$ wavelength channels. In particular, the present invention includes progressive serial space switching in which a cross-connect is configured as a linear series of modules, each module performing a portion of the total space switching. The device may readily be extended to a cross-connect with more input fibers. According to another embodiment of the invention a cross-connect device with, and a method for, $N_f$ input and output fibers, with each fiber carrying $N_1$ wavelength channels is described. The device is not based on a decomposition into devices with two (2) inputs and outputs but on serial space switching, and more particularly progressive serial space switching. In still other embodiments switching methods for respectively $N_f$ and two (2) wavelength channels are described.

Figure 4A:
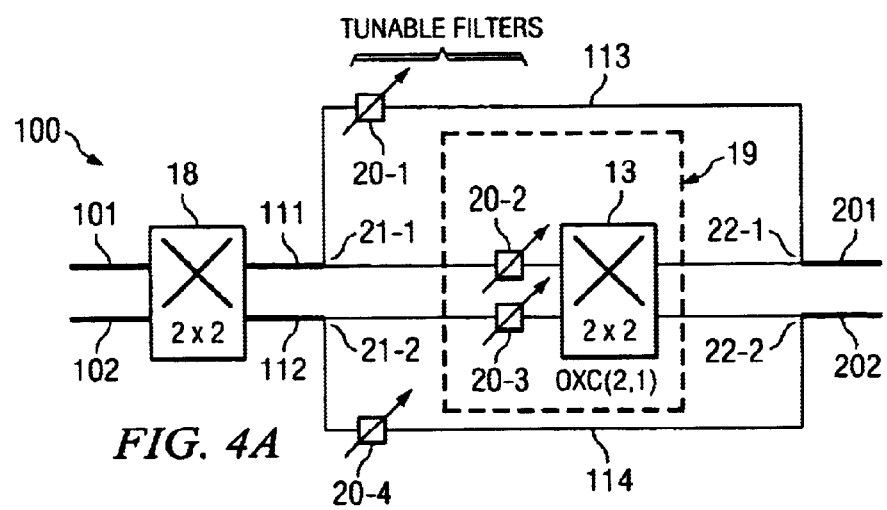
FIGS. 4A and 4B show schematic representations of an optical cross-connect switching device for two (2) input and two (2) output fibers and two (2) channels per fiber in accordance with two similar embodiments of the present invention.

As indicated above, conventional cross-connects demultiplex all the channels before switching and multiplex the switched channels onto the output fibers after switching. FIG. 4A shows schematically an optical cross-connect switching device 100 in accordance with an embodiment of the present invention with two (2) input 101, 102 and two (2) output optical fibers 201, 202 whereby each of the fibers 101, 102, 201, 202 carries two (2) wavelength channels per fiber. The device 100 does not require demultiplexing of all channels before switching. The cross-connect switching device 100 includes a space switch 18 that precedes a demultiplexing or partial demultiplexing step using filters 20 followed by a further smaller cross-connect switching device 19. The 2×2-space switch 18 is configured so that it switches the group of channels on entire fibers 101, 102 if half or more of all channels (a total of two in FIGS. 4A and 4B) have to be cross-connected from an input fiber 101, 102 to the other output fiber 202, 201, respectively (and viceversa, i.e. when half or more of all channels have to be cross-connected from input fiber 102 to output fiber 201). This switching implies that at least half of the channels have been switched by the space switch 18 to the correct output fiber 201, 202 and a maximum of half of the wavelength channels are left to be cross connected in the further cross-connect switching device 19. The channels which have been switched onto their correct output fiber 201, 202 by the space switch 18 are selectively transmitted past the second cross-connect switching device 19 by partial demultiplexing, i.e selecting of these channels by means of splitters 21-1, 21-2 and the filters 20-1, 20-4 along fibers 113, 114. These partially demultiplexed or selected channels are then directly provided to combiners or multiplexers 22-1 and 22-2 and so to the respective output fibers 201, 202. A splitter 21-1, 21-2 duplicates all the channels from one output fiber 101, 102 of space switch 18 onto its output fiber 111, 112. A splitter such as splitter 21-1 or 21-2 and one of the filters 20-1 or 20-4 together select one channel, e.g. partially demultiplex the group of channels to obtain one channel thereof. The output fibers 111, 112 of space switch 18 are also connected to the further cross-connect switching device 19 through filters 20-2 and 20-3. The relevant filter 20-1 through 20-4 is set to select the communication channel with the wavelength which may be transmitted along fiber 113, 114 directly to the output fiber 201, 202, respectively. Preferably, filters 20-1 through 20-4 are tuneable so that the cross-connect switching device 100 may be adaptively configured to changing traffic. Hence, the combined use of tuneable filters 20 and splitters 21 results in selective partial demultiplexing in which individual channels may be selectively demultiplexed from a group of channels.

As shown, this cross-connect switching device 100 does not include wavelength conversion. The smaller further cross-connect switching device 19 only switches half the number of channels (2) per fiber which are input to the space switch 18 and can therefore be of half the size of a conventional cross-connects switch which follows a demultiplexer. In the cross-connect 100 of the embodiment of FIG. 4A, only two (2) channels have to be cross-connected by the further cross-connect switching device 19. However, it is not known which two (2) of the four (4) channels have to be cross-connected. Hence, it is preferable if tuneable filters 20-2 and 20-3 are provided on fibers 111 and 112, respectively after splitters 21-1, 21-2 to select the channels which will be switched in a further space switch 13. The output from the further cross-connect switching device 19 and the filters 20-1 and 20-4 are fed to multiplexers 22-1 and 22-2, respectively for multiplexing of the channels onto the relevant output fibers 201, 202.

In the embodiment shown in FIG. 4A, tuneable filters 20-2 and 20-3 are preferably used on each of the fibers 111, 112 leading from the splitters 21-1, 21-2 to the further cross-connect switching device 19. In accordance with a modification of this embodiment shown in FIG. 4B, the filters 20-2, 20-3 on fibers 111, 112 may be placed after the space switch 13 and before the multiplexers 21-1, 21-2 while still providing the same functionality due to the linear nature of the filtering and switching processes. From the embodiments in FIGS. 4A and 4B, it can be seen that the further space switch 13 and the filters 20-2 and 20-3 form a select and cross-connect switching unit 19 in accordance with the present invention. In the special case of this embodiment, select and cross-connect unit 19 is a 2×2 optical cross-connect 2,1 (OXC (2,1)) which is the final switching operation before multiplexing onto the output fibers 201, 202. In a more general case with more than two input fibers 101, 102 and more than two (2) wavelength channels per fiber, the select and cross-connect switch unit 19 switches more channels and may itself be built up of further space switching and select and cross-connect units.

From the above description certain aspects of the present invention may be understood. The communication channels on input lines 101, 102 are grouped together and are switched en bloc in space switch 18 in these groups. Additionally, individual channels are partially demultiplexed out of the group using a selector formed by a filter 20-1 through 20-4 and splitter 21-1 and 21-2. The selected channel or channels are thus directed to the relevant output fiber 210, 202. A first aspect of the present invention is to group a plurality of communication channels into one or more groups and to switch these groups in their entirety and a second aspect is to partially demultiplex (select) individual channels from at least one group of channels and the first and second aspects are combined in such a way that any communication channel on an input fiber of a cross-connect switching device in accordance with the present invention may be switched to any one output fiber thereof.

Figure 4B:
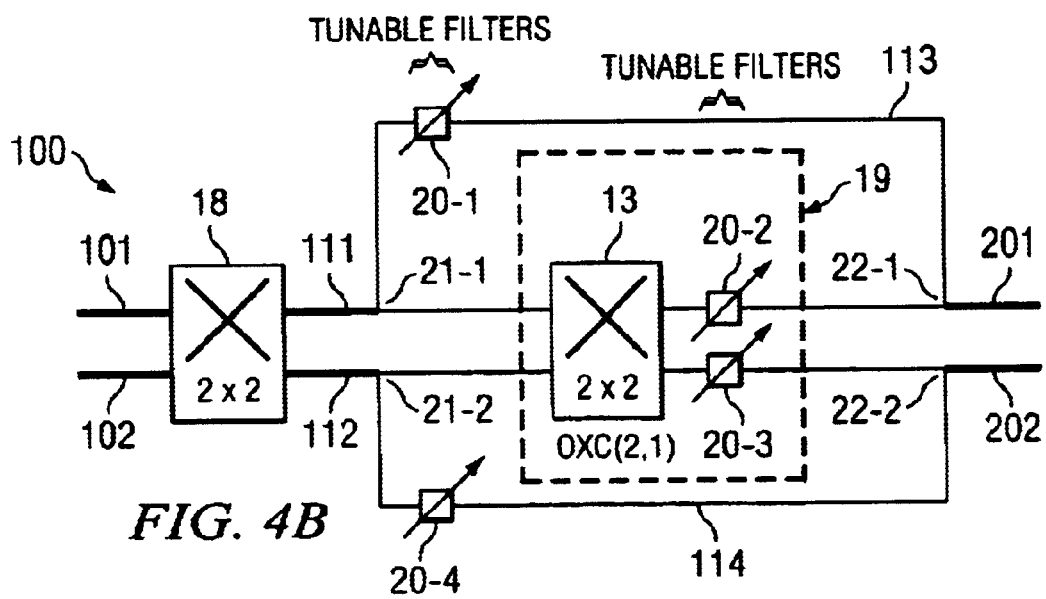
Figure 5A:
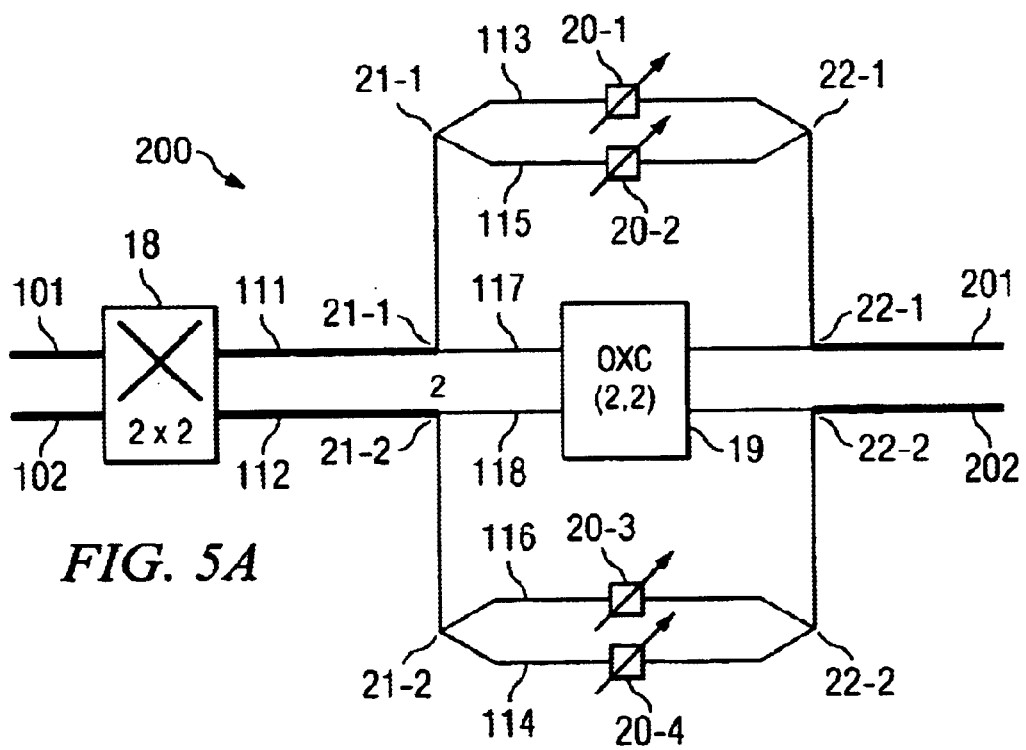
FIGS. 5A and 5B show cross-connect switching devices in accordance with other embodiments of the present invention of the type shown in FIG. 4A with four (4) channels per fiber and FIG. 4B with eight (8) channels per fiber whereby OXC (2,L) stands for an optical cross-connect with two (2) input and two (2) output fibers each carrying L wavelength channels.
Figure 5B:
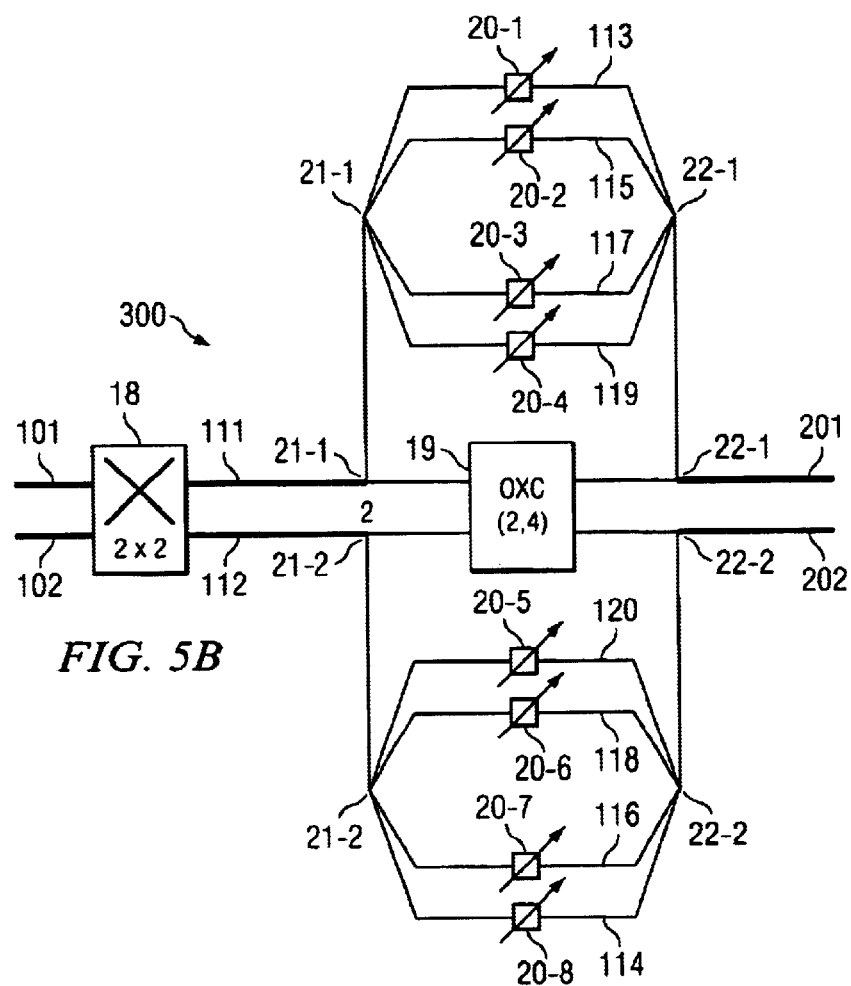

The cross-connect switching device 100 of FIG. 4 can be extended to a cross-connect switching device for a larger number of wavelength channels per fiber. FIGS. 5A and 5B illustrate this and show the extension to a cross-connect switching device 200, 300 having four (4) and eight (8) wavelength channels per fiber, respectively. It should be noted that components in the remaining figures which are the same as those in FIGS. 4A and 4B carry the same reference numbers. In general, for a two input-fiber system with any number of wavelength channels per fiber, a first 2×2 space switch 18 can be used to switch the groups of channels associated with entire fibers if more than half of all wavelength channels of these fibers have to be cross-connected to another fiber. The space switch 18 is followed by a further and smaller cross-connect switching device 19 having two (2) input and two (2) output fibers but with only half of the number of channels per fiber to be switched compared with the cross-connect switching device 100, 200, 300. The cross-connect switching device 19 is of smaller dimension than cross-connect switching device 100, 200, 300 and can be either made from a conventional 2×2 cross-connect switch or may itself be made of a cross-connect switching device similar in structure to device 100 but smaller in dimension, i.e. it may include a further 2×2 space switch 18 connected via splitters to an even smaller cross-connect switching device and so on. In these embodiments, the filters preferably have the necessary tuneability to be able to select any one of the channels on the input fibers 101, 102.

For example, a further embodiment of the present invention is shown schematically in FIG. 5A and includes a cross-connect switching device 200 having two (2) input fibers 101, 102 feeding four wavelength channels per fiber to a 2×2 space switch 18. The 2×2 space switch 18 is used to switch the groups of channels of entire fibers (en bloc) if more than half of all wavelength channels on these fibers have to be cross-connected to another output fiber 202, 201. Partial demultiplexing to extract individual channels is performed by a combination of splitters and filters as was discussed with respect to FIGS. 4A and 4B. Splitters 21-1 and 21-2 are provided respectively on the output fibers 111, 112 of the space switch 18. The splitters 21-1 and 21-2 duplicate the four (4) channels on each fiber 111, 112 onto two (2) fibers 113, 115; 114, 116 respectively with the channels on fibers 111 and 112 also being fled directly to a 2×2 cross-connect cross-connect switching device 19 (OXC 2,2). The wavelength channels destined for an output fiber 201, 202 without switching in the device 19 are selected out by filters 20-1, 20-2, 20-3, 20-4 on fibers 113, 115 and 114, 116 respectively. The remaining half of the channels (two (2) per fiber) on fibers 111, 112 respectively are switched by the 2×2 cross-connect switching device 19 which can switch any one of the two (2) channels per input fiber onto any one of its output fibers. The outputs from switch 19 and filters 20-1 through 20-4 are multiplexed or combined in combiners or multiplexers 22-1 and 22-2 onto output fibers 201, 202.

The extension of this embodiment to 8 channels per input fiber 101, 102 is shown in FIG. 5B. In the cross-connect switching device 300 in accordance with this embodiment a first 2×2 space switch 18 can be used to switch the groups of wavelength channels of entire fibers if more than half of all wavelength channels of these fibers have to be cross-connected to another fiber. Splitters 21-1 and 21-2 duplicate the channels on the output fibers 111, 112 from space switch 18 onto four (4) additional fibers 113, 115, 117, 119 and 114, 116, 118, 120 respectively. Tuneable filters 20-1, 20-2, 20-3, 20-4 select the wavelength channels which should be transmitted directly to output fiber 201, whereas tuneable filters 20-5, 20-6, 20-7, 20-8 select the wavelength channels which should be transmitted directly to output channel 202. Tuneable filters 20 and splitters 21 form a partial demultiplexer for selective extraction of individual channels from groups of channels on the input fibers. The remaining channels which were not selected in the partial demultiplexing step and which make up half of the total channels per fiber, (which equals four (4)) are switched by the optical cross-connect switching device 19 which in this case is a two (2) fiber input, four (4) channels per fiber switch (OXC 2,4). The outputs from the filters 20-1 through 20-8 and the cross-connect switching device 19 are combined or multiplexed in multiplexers or combiners 22-1 and 22-2 onto the respective output fiber 201, 202.

The advantages of the cross-connect switching devices 100, 200, 300 described above are that any cross-connect 100, 200, 300 can easily be upgraded to a higher number of wavelength channels per fiber by using progressive serial space switching which will be described in more detail below. Further, there is a significant reduction in the number of space switches required. For a cross-connects using a modular build-up and progressive serial space switching in accordance with the present invention no limit is foreseen as to the type of space switch and/or tuneable filter used. Cross-connect switching devices 100, 200, 300 can also be used in accordance with the present invention as at least one of the $2,2^M$ where M is an integer optical cross-connects (OXC $2,2^M$) of the structure as shown in FIG. 3 for more than two (2) input and output fibers. The reduced number of elementary 2×2 space switches can be illustrated for the case of high density WUM with sixty-four (64) wavelength channels per fiber and for a cross-connect of four (4) input and output fibers. The normal architecture (FIG. 3) requires three hundred eighty-four (384) switches and the present invention only requires forty-two (42) space switches to achieve the same results. A further advantage is that the cross-connect 100, 200, 300 can have a very simple structure if its dimension is fixed.

Figure 6:
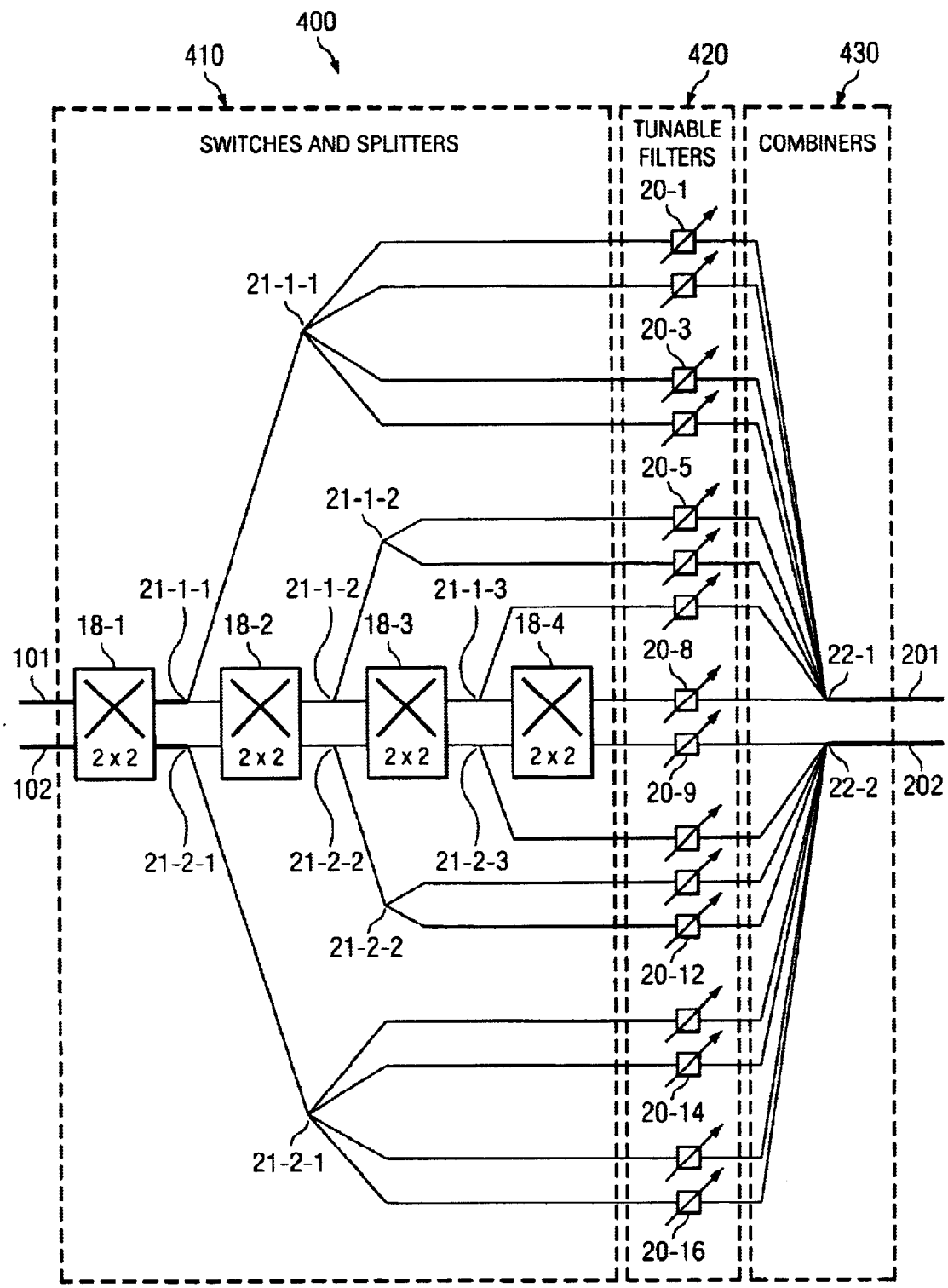
FIG. 6 shows schematically a further cross-connect switching device in accordance with an embodiment of the present invention which demonstrates a modular implementation of the cross-connect of FIG. 4B.

A cross-connect 400 in accordance with an embodiment of the present invention using progressive serial space switching for the case of two (2) fibers and eight (8) channels per fiber is shown schematically in FIG. 6. This cross-connect 400 consists of three (3) stages 410, 420, 430. The first stage 410 consists of a series of nested 2×2 space switches 18-1, 18-2, 18-3, 18-4, each combined with its own splitters 21-1-1, 21-1-2 through 21-2-4 and this stage can be fabricated as a photonic integrated circuit (PIC). The second stage 420 includes a plurality of filters 20-1 through 20-16. Preferably these filters are tuneable filters. The filters 20-1 through 20-16 select out those wavelength channels which are to be passed to the respective output fiber 201, 202 without going through the next space filter 18 in the cascade thus forming with a splitters a distributed partial demultiplexer. Note that the filters 20 directly connected to the last switch 18-4 of the cascade of switches 18-1 through 18-4 are placed after the space switch 18-4. This does not change the functionality of the device due to the linearity of the operations switching and filtering. Each space switch 18-1 through 18-4 is used to switch all the wavelength channels of entire input fibers if more than half of all wavelength channels of these fibers have to be cross-connected to another fiber. Each 2×2 space switch 18-1 through 18-4 has two (2) input fibers but the number of channels per fiber which are to be actively selected decreases by a factor of two (2) at each stage of the serial cascade of space switches 18-1 through 18-4. Hence, this type of switching is described in accordance with the present invention as progressive serial space switching.

In the above embodiments of the present invention wavelength conversion has not been included in order to simplify the explanation. The principle of switching groups of channels first in the space domain can also be applied when full connectivity and wavelength conversion is required. Cross-connect switching devices 100 which are further embodiments in accordance with the present invention are shown schematically in FIGS. 7A and 7B. Reference should be made to FIG. 4A for a general description of the cross-connects 100 of FIGS. 7A and 7B. Here, only the differences will be discussed. As shown schematically in FIG. 7A, a wavelength converter 23-1, 23-2, 23-2, 23-4 is added into each fiber having a tuneable filter 20 before the channels on these fibers are combined or multiplexed in multiplexers 22-1 and 22-2. The embodiment of FIG. 7A maintains full modularity, i.e. the sub cross-connect unit 13 can in general be formed from further cross-connect switching devices 100 but with a smaller number of channels per fiber by progressive serial space switching in accordance with the present invention. Cross-connect switching devices 100 in accordance with this embodiment can be build in a similar modular fashion as the ones without wavelength conversion described with reference to FIG. 6 above.

Figure 7A:
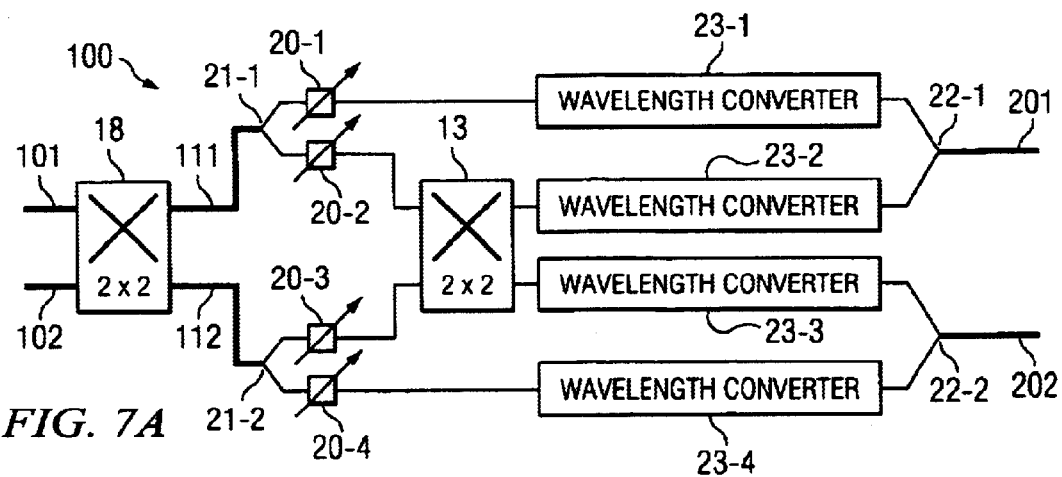
FIGS. 7A and 7B show schematic representations of optical cross-connect devices in accordance with further embodiments of the present invention with wavelength conversion.
Figure 7B:
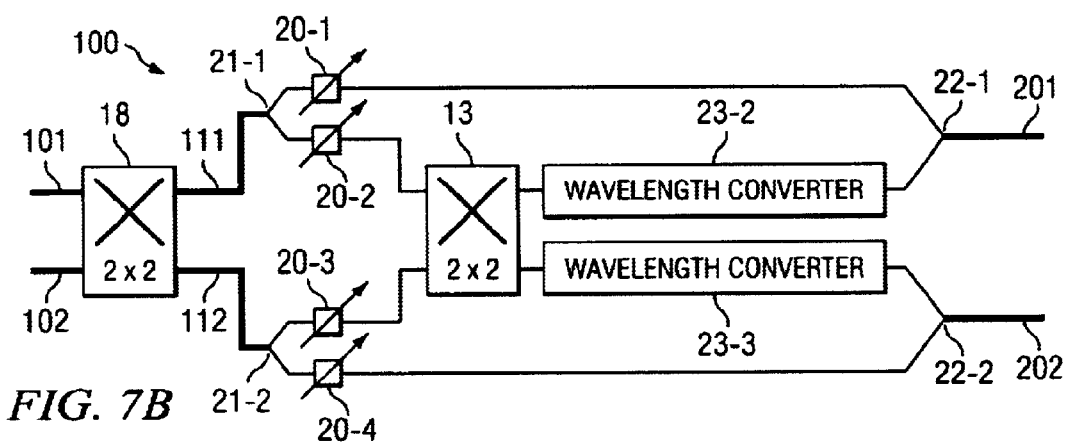

Placing a wavelength converter such as converter 23-1 through 23-4 in each fiber as shown in FIG. 7A makes use of more converters 23 than are required as a minimum. A further reduction in number of components is possible by noticing that at most half of the channels have to be converted in wavelength. This follows from the fact that the number of channels is identical for all output fibers. A cross-connect 100 shown schematically in FIG. 7B is also an embodiment of the present invention and provides a reduction in the number of required wavelength converters by a factor two (2). Only two (2) wavelength converters 23-2 and 23-3 are used in the output fibers of the switch 13. One disadvantage of such a cross-connect 100 as shown in FIG. 7B is that it is not as modular as the one of FIG. 7A, e.g. when upgrading the cross-connect 100 of FIG. 7B to a higher number of channels per fiber (e.g. to the case of four (4) wavelength channels per fiber using progressive serial space switching as explained with reference to the embodiment of FIG. 6), the cross-connect 100 of FIG. 7B for two (2) wavelength channels per fiber must be adapted before further extending this cross-connect 100 to a cross-connect for four (4) channels per fiber.

In accordance with the present invention it is preferable to use the progressive serial space switching concept illustrated by the embodiment of FIG. 6, but the present invention is not limited thereto. A cross-connect 100 for two (2) fibers and $2^M$ channels can also be build from a 2×2 space switch 18 and a conventional cross-connect 19 for two (2) fibers and $2^{(M-1)}$ channels, as shown schematically in FIG. 5B for M=3. The reduction in components will be less but still noticeable. In such a cross-connect switching device at least switching of entire groups is carried out (space switch 18) as well as at least one step of selection of individual wavelength channels (tuneable filters 20).

Figure 8:
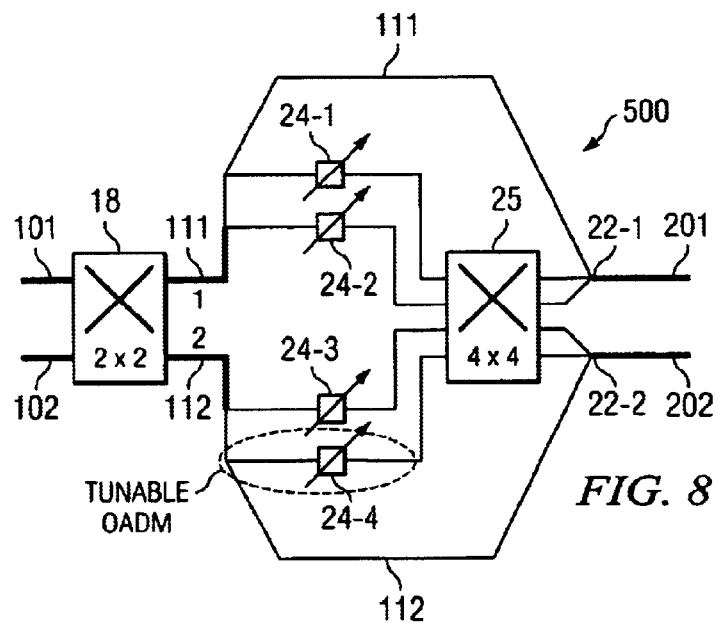
FIG. 8 shows schematically an optical cross-connect switching device in accordance with another embodiment of the present invention for two (2) input and output fibers carrying each four (4) channels using tuneable optical add drop multiplexers.

The splitters 21, combiners or multiplexers 23 and the tuneable filters 20 in accordance with the present invention may be replaced by equivalently functioning devices such as tuneable demultiplexers and multiplexers, e.g. add-drop multiplexers (OADM's). If a cross-connect switching device for two (2) fibers and $2^{(M-1)}$ channels in accordance with the present invention makes use of tuneable add-drop multiplexers, only half the number of OADMs are required than would be necessary in a conventional switch. A further embodiment of a cross-connect switching device 500 in accordance with the present invention is shown schematically in FIG. 8. A 2×2 space switch 18 has two (2) input fibers 101, 102 and can be used to switch the group of communication channels on entire fibers if more than half of all wavelength channels of these fibers have to be cross-connected to another fiber. Output fibers 111, 112 of space switch 18 carry all the wavelength channels on each of these fibers towards the respective output fibers 201, 202. An OADM 24-1, 24-2, 24-3, 24-4 is used to extract (drop) one of the channels from the respective fiber 111, 112 to a 4×4 switch 25. All the channels that, after the first space switch 18, are not dropped by the OADM's 24 (these are at least 50% of the channels) are routed outside the smaller cross-connect 25 and can be kept together in a wavelength channel group which is smaller than the group switched in space switch 18. This reduction in tuneable OADM's 24 applies however only if a cross-connect of $2^M$ fibers and $2^M$ channels is built from a 2×2 space switch and a cross-connect for $2^M$ fibers and $2^{(M-1)}$ channels.

Figure 9A:
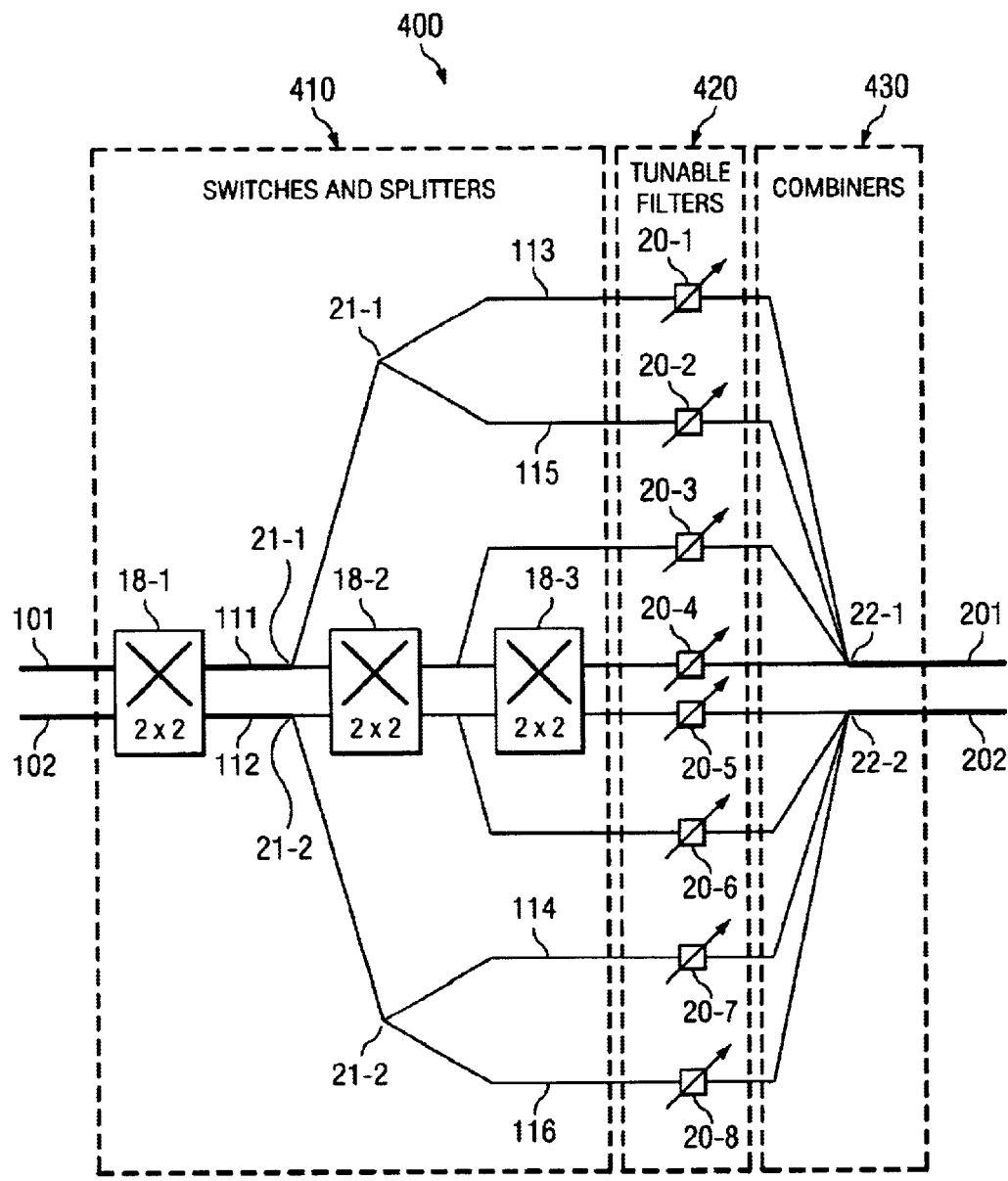
FIGS. 9A and 9B show further cross-connect switching devices in accordance with further embodiments of the present invention.
Figure 9B:
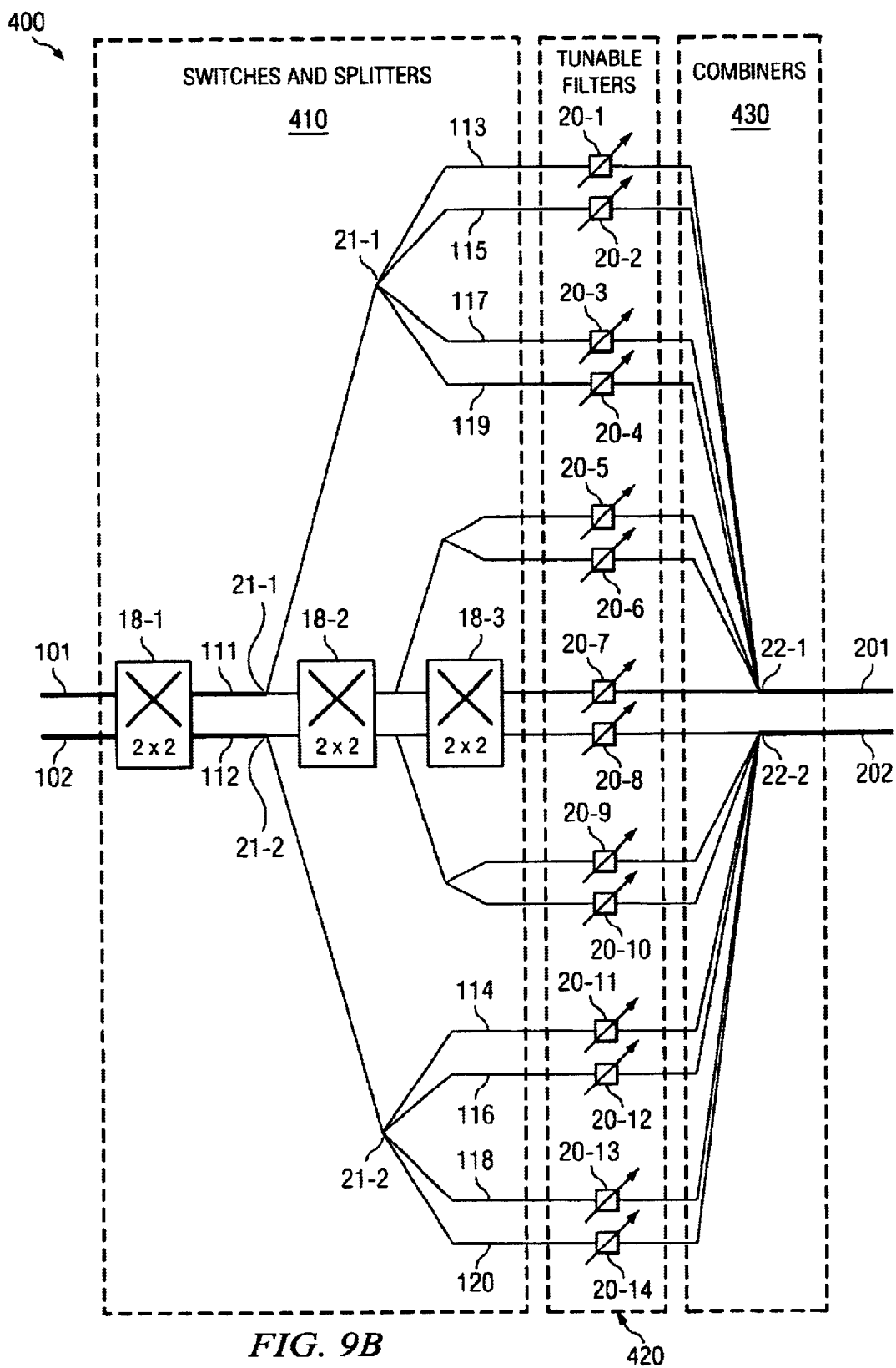

Cross-connect switching devices in accordance with the present invention are not restricted to systems with a power of two (2) as the number of channels per fiber. In fact, cross-connects in accordance with the present invention for $2^M+1$, $2^M+2$ through $2^{M+1}-1$ channels per fiber require the same number of space switches 18 as a cross-connect for $2^M$ channels per fiber and just require more filters 20 and different splitters 21 and combiners 22. This is illustrated by comparing a cross-connect switching device 400 for four (4) channels per fiber in FIG. 9A with a cross-connect switching device 400 for seven (7) channels per fiber in FIG. 9B, both of which are embodiments of the present invention. FIGS. 9A and 9B have three (3) stages 410, 420, 430 as already described for the embodiment of FIG. 6. The second stage 420 includes a plurality of tuneable filters 20-1 through 20-8 and the third stage 430 includes the combiners or multiplexers 22-1 and 22-2. The main differences lie in the first stage 410. In FIG. 9A the splitters 21 of the first stage of the cascade 18-1 to 18-3 of serially arranged 2×2 space switches 18 duplicate the four (4) channels per fiber on the output fibers 111, 112 of the first space switch 18-1 onto fibers 113, 115, 114, 116. The duplicate of the channels per fiber, i.e. four (4), are fed directly towards the output fibers 201, 202 and two (2) of the channels are selected therefrom (partially demultiplexed) by the filters 20-1, 20-2, 20-7, 20-8. The channels on fibers 111, 112 are fed to a second space switch 18-2. In the second and third stages of the cascade of space switches 18 the above process of switching groups of channels and selection of individual channels is carried out, two (2) further channels per output fiber being selected by filters 20-3, 20-6 and 20-4 and 20-5 in the second and third stage of the cascade, respectively. In the embodiment of FIG. 9B, the splitters 21 of the first stage of the cascade duplicate the channels on the output fibers 111, 112 of the first space switch 18-1 into four (4) parallel fibers while the channels on output fibers 111, 112 are fed directly to the next space switch 18-2 in the series. On the eight (8) fibers 113, 115, 117, 119, 114, 116, 118, 120 one (1) channel per output fiber is selected by the filters 20-1, 20-2, 20-3, 20-4 and 20-11, 20-12, 20-13, 20-14, respectively. In the second stage of the cascade after the space switch 18-2, the channels on the output fibers of switch 18-2 are duplicated into two (2) fibers, from which two (2) channels are selected for the relevant output fiber 201, 202 by filters 20-5, 20-6, 20-9, 20-10. The final two (2) channels are selected in the third stage of the cascade by filters 20-7 and 20-8. If a further channel is added to the input fibers 101, 102, i.e. to make it up to eight (8) channels per fiber, either an additional stage must be added to the cascade of space switches 18 (see FIG. 6 as an example of this structure) or one (1) of the space switches 18, particularly the last in the cascade 18-3 must be changed to a conventional cross-connect switch which has two (2) output fibers and any of the incoming two (2) channels per fiber on this last stage can be switched to one (1) of the two (2) output fibers. Both of these alternatives are separate embodiments of the present invention.

A cross-connect switching device in accordance with the present invention can be implemented with fixed wavelength filters 20 if all the channels can be converted in wavelength prior to entering the cross-connect device. By selecting the wavelength conversion appropriately, the required selection of wavelength channels by a cross-connect with non-tuneable filters can be made as adaptable as a cross-connect with tuneable filters. Such wavelength conversion can be added intentionally or can be present already as part of e.g. regeneration circuits. A cross-connect 600 in accordance with an embodiment of the present invention with fixed wavelength filters 20 and preceded by wavelength conversion is depicted schematically in FIG. 10. This device includes the three (3) stages 410, 420, 430 which are similar to those of FIGS. 6, 9A or 9B with the modification in the second stage 420 that the filters 20 are of fixed wavelength. In addition a fourth stage 440 is added in which the groups of channels on the two (2) input fibers 101, 102 are first each demultiplexed in demultiplexers 26-1 and 26-2 and each of the plurality of outgoing wavelength channels can be wavelength converted in wavelength converters 27 and then multiplexed onto two (2) fibers in multiplexers 28 before being fed to the space switch 18-1. It is necessary to add additional wavelength conversion possibility after or within the cross-connect 600 if the channels on the output fibers 201, 202 are required to have the same wavelength as the incoming channels on the input fibers 101, 102.

Figure 11:
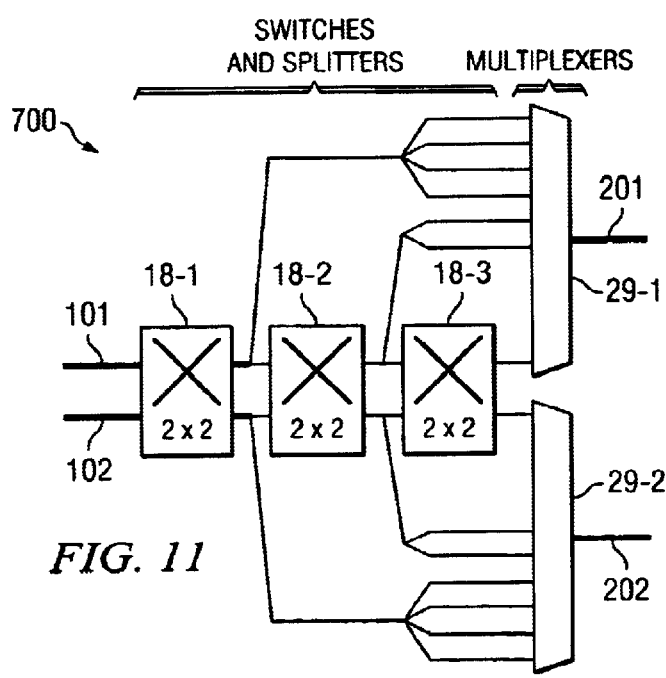
FIG. 11 is a schematic representation of a cross-connect switching device in accordance with a still further embodiment of the present invention.
Figure 10:
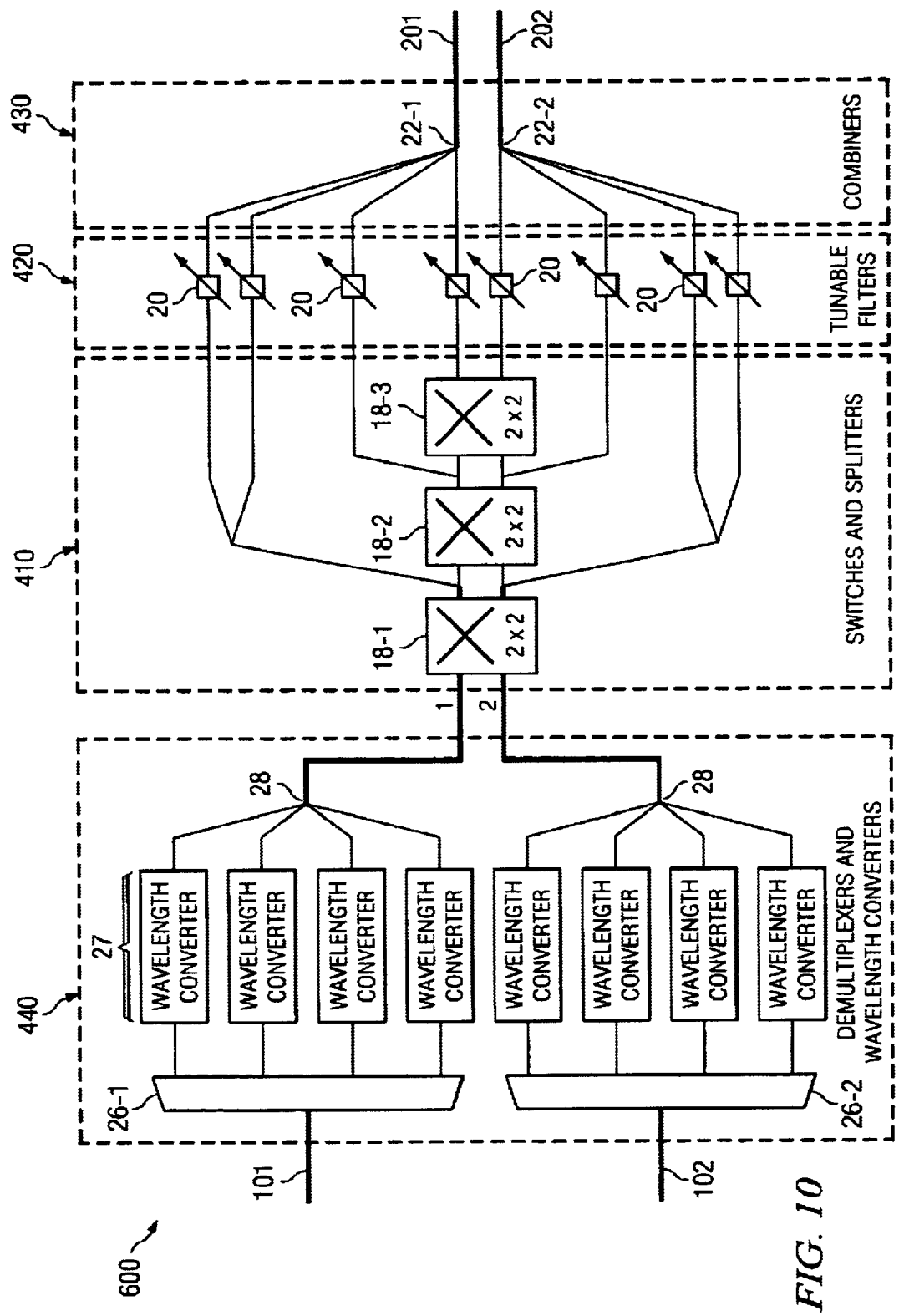
FIG. 10 is a schematic representation of a cross-connect switching device in accordance with a further embodiment of the present invention having fixed wavelength filters and prior wavelength conversion.

Moreover, if a reduced functionality can be tolerated, the cross-connect 600 of FIG. 10 may be used without wavelength conversion. Such a cross-connect 700 which is an embodiment of the present invention is shown schematically in FIG. 11. This cross-connect 700 has the cascade of space switches 18-1 through 18-3 as has been described with respect to FIGS. 6 and 9, however, channels on the output fibers of the splitters 21 and the final switch 18-3 are wavelength selected and combined or multiplexed by the multiplexers 29-1, 29-2 which have an equivalent function to the fixed filters 20 and the multiplexers 23 of the cross-connect 600 of FIG. 10. The cross-connect 700 of FIG. 11 has the disadvantage that only groups of channels can be cross-connected in accordance with fixed wavelengths rather than being adaptively selected by tuneable filters, but this cross-connect 700 has the great advantage of a simple structure that is most suited for implementation as a photonic integrated circuit or PIC.

In the above description of the present invention only two (2) input fibers 101, 102 have been considered. The present invention is not limited thereto but may include any number of input fibers. Cross-connect devices with more than two (2) input and output fibers can be constructed, for instance, as indicated in FIG. 3 by using a plurality of 2×2 cross-connect switching devices (OXC of FIG. 3) of which at least one is a switching device in accordance with one of the embodiments of the present invention.

Figure 12:
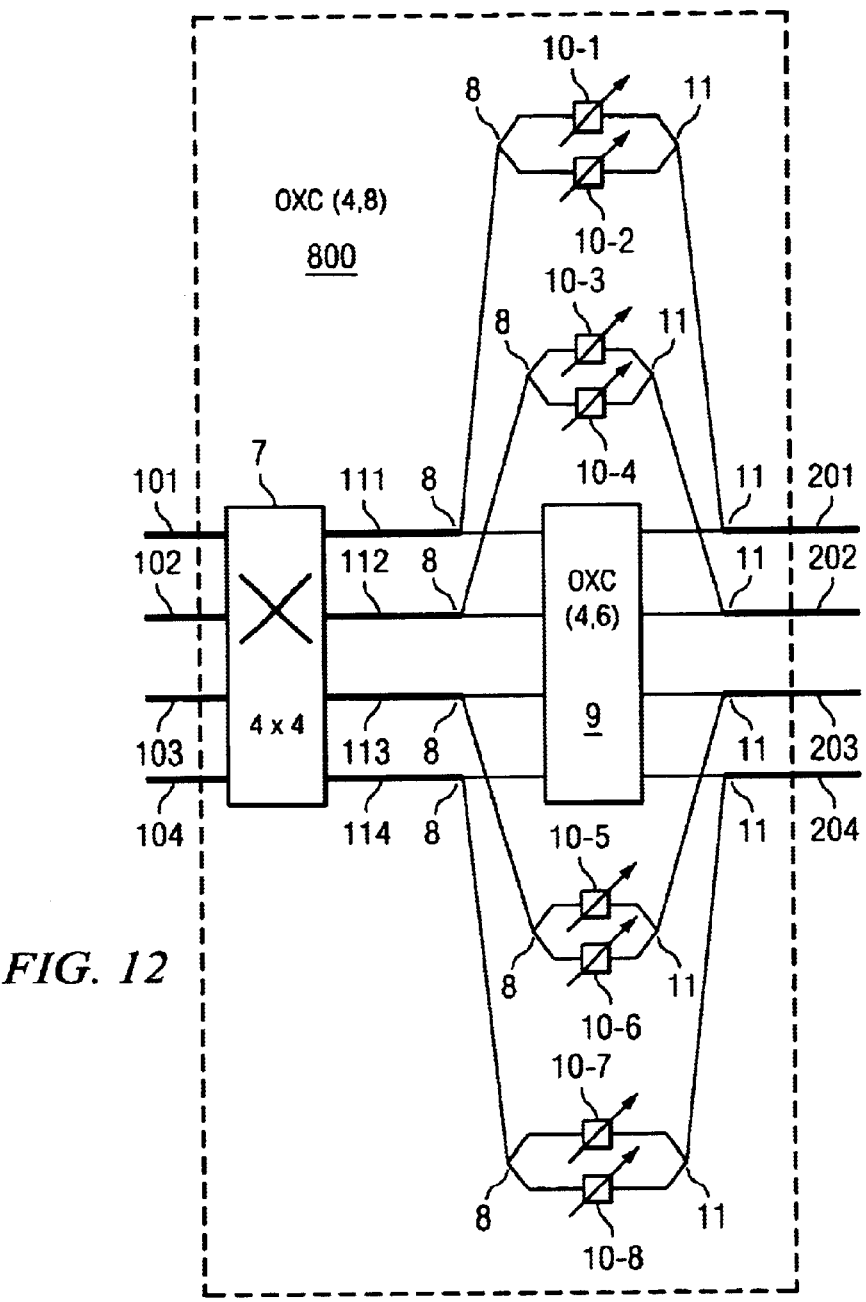
FIG. 12 is a schematic representation of a cross-connect switching device with $N_f$ input and output fibers in accordance with yet another embodiment of the present invention.

Alternatively, the cross-connect device and/or method consisting of alternating space switching and demultiplexing including possibly also filtering and progressive serial space switching in accordance with the present invention can also be applied directly to the case where there are more than two (2) input and output fibers. FIG. 12 shows schematically a cross-connect device 800 in accordance with another embodiment of the present invention for four (4) input and four (4) output fibers 101, 102, 103, 104. For explanation purposes it may be assumed that each of the fibers is carrying eight (8) wavelength channels but the present invention is not limited thereto. The device 800 has a first 4×4 space switch 7. In the switch 7 the groups of wavelength channels of entire fibers are switched, meaning that all channels belonging to the same input fiber 101, 102, 103, 104 are switched towards the same output fiber 201, 202, 203, 204. The group of channels on each input fiber 101 through 104 are switched if more than a number of channels "A" have to be switched towards an output fiber, the number "A" being equal to or greater than the quotient of the number of channels per fiber and the number of input fibers (here this equals 25%). After the first switch 7, splitters 8-1, 8-2, 8-3 and 8-4 duplicate the channels of each of the output fibers 111, 112, 113, 114 of switch 7 onto two (2) further fibers. On these fibers two (2) channels per fiber (total eight (8)) are filtered out (partially demultiplexed) by tuneable filters 10-1, 10-2, 10-3, 10-4, 10-5, 10-6, 10-7, 10-8. Then a cross-connect device 9, with four (4) input and four (4) output fibers, the fibers carrying six (6) channels per fiber, is used to switch the remaining channels. Finally, the selected channels are multiplexed or combined by multiplexers or combiners 11-1, 11-2, 11-3, 11-4. Conceptual similarity will be noticed between the cross-connect device 800 of FIG. 12 and the device 300 of FIG. 5B with the difference that there are now four (4) input and output fibers. Just as described with reference to FIG. 6, the cross-connect device 9 can be constructed in a progressive modular manner as a smaller version but of the same type as the original cross-connect device 800 using progressive serial space switching. For instance, this cross-connect device 9 can comprise a further 4×4 space switch, means for splitting off two (2) channels per output fiber of the further 4×4 space switch and a further 4×4 cross-connect device with fibers carrying four (4) channels each. The principle of progressive serial space switching in accordance with the present invention may be continued by splitting off one (1) channel per fiber from the outputs of the further 4×4 cross-connect switch and this procedure repeated until a final 4×4 cross-connect device with four output fibers each carrying one (1) channel is obtained. Note that, as has been mentioned above, the nested construction of space switches in a serial cascade as exemplified by FIG. 6 can also be stopped at an intermediate position with a final conventional cross-connect device capable of switching any channel of a predetermined number of channels per fiber to any one of the output fibers.

In general in accordance with a generalized embodiment of the present invention, for a cross-connect with $N_f$ input and output fibers and $N_1$ channels per fiber, an $N_f$ by $N_f$ space switch is provided, after which a maximum of $[N_1/2 (N_f-1)]$ fibers are split off or partially demultiplexed per output fiber of the $N_f$ by $N_f$ space switch, with $[N_1/2 (N_f-1)]$ being the smallest integer larger than or equal to $N_1/2(N_f-1)$. After that stage, a cross-connect with $N_f$ input and output fibers with a minimum $N_1-[N_1/2 (N_f-1)]$ channels per fiber is provided, and so on.

In accordance with the present invention a combination of progressive and non-progressive serial space switching (direct and indirect serial space switching) can be applied. For instance the cross-connect device 800, with four (4) input and four (4) output fibers, each carrying six (6) channels, shown in FIG. 12, can be constructed equivalently by using a plurality of OXC as is shown in FIG. 3 in which at least one of the OXC is a cross-connect switching device in accordance with an embodiment of the present invention. Such a cross-connect switching device 900 in accordance with a further embodiment of the present invention is shown schematically in FIG. 13. The complete device 900 has five (5) input fibers 101 through 105 and five (5) output fibers 201 through 205. Within device 900 there are provided a plurality of switching modules 1-1 through 1-4. At least one of these modules 1 has less number of input and output fibers than the main device 900. For instance, module 1-1 has two (2) input (101, 102) and output fibers (301, 302). Module 1-1 is a cross-connect switching device in accordance with an embodiment of the present invention, e.g. as shown in FIG. 6. For instance, it may include three (3) space switches 18 in a cascade with splitters 21, tuneable or non-tuneable filters 20 and combiners 22.

Figure 14:
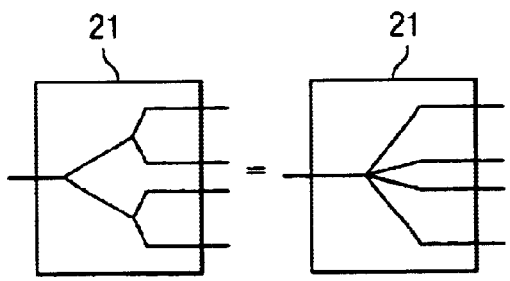
FIG. 14 shows equivalent representations of splitters and combiners as used in accordance with the present invention.

In the above description of embodiments of the present invention splitters 20 and multiplexers or combiners 22 are used. In the various drawings and embodiments splitters 20 and combiners 22 are represented as in FIG. 14—left part. Note however that the structure in FIG. 14—right part is equivalent from a functional point of view and may be used instead. Further, the splitters mentioned with respect to any of the embodiments of the present invention may have a freely selectable splitting ratio, i.e. the ratio indicating the power distribution spread over the splitter's output fibers. In any cross-connect device in accordance with the present invention any suitable splitting ratio is acceptable.

Figure 15:
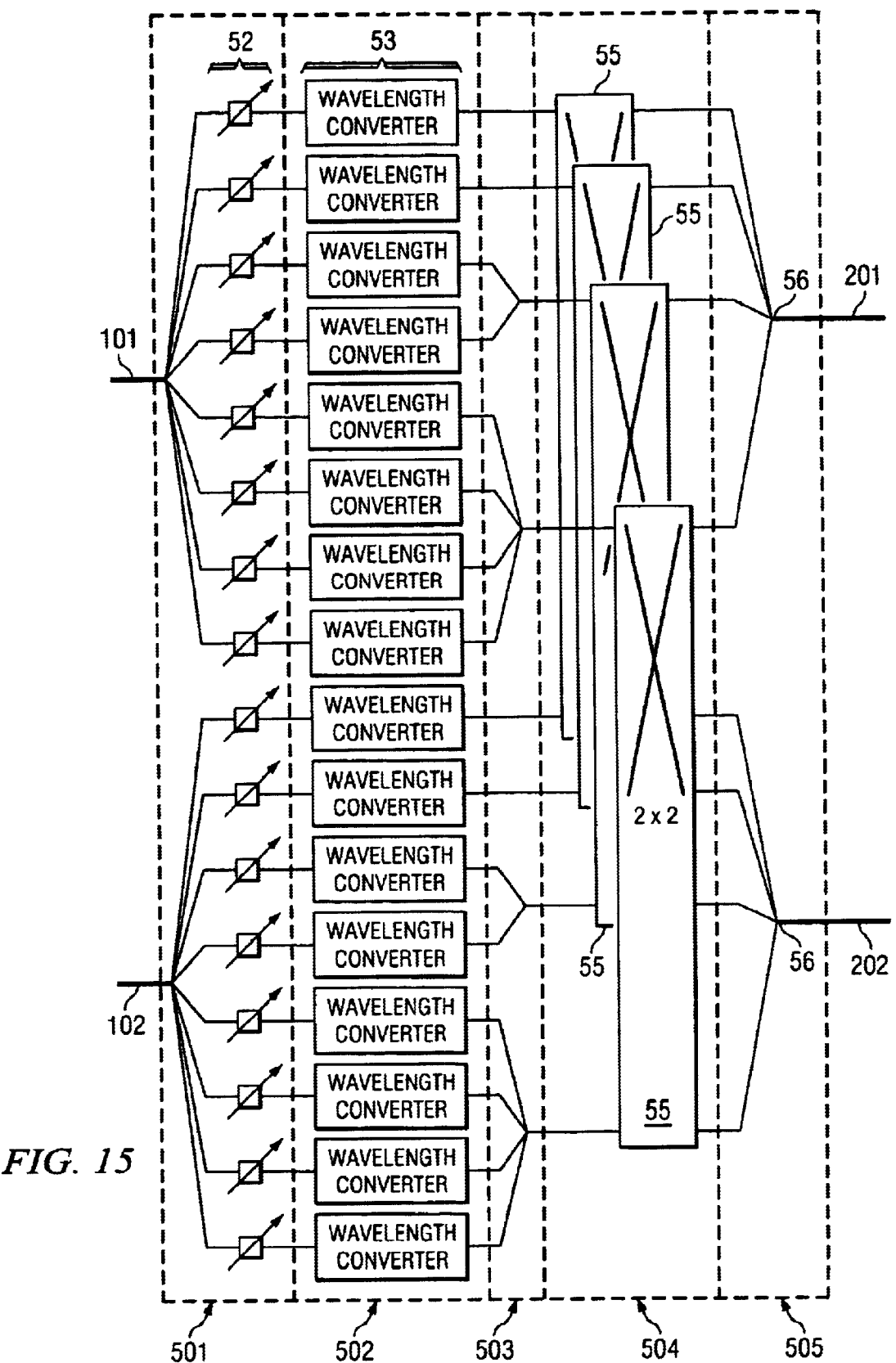
FIG. 15 is a schematic representation of a further embodiment of a cross-connect switching device in accordance of the present invention.

A cross-connect switching device 50 in accordance with a further embodiment of the present invention is shown schematically in FIG. 15. Whereas several of the previous embodiments have been described with reference to serial space switching, the device 50 makes use of parallel space switching. The cross-connect device 50 may be represented as five stages 501 to 505. In the first stage 501, the channels on incoming lines or fibers 101, 102 are demultiplexed. For instance, as shown in FIG. 15 there are eight (8) channels per fiber 101, 102 and these are demultiplexed by means of splitters 51 and tuneable filters 52, one (1) for each channel. In optional stage 502 the wavelength of each of the demultiplexed channels can be converted using wavelength converters 53, one (1) per demultiplexed channel. Wavelength conversion is used to avoid conflicts when recombining those channels onto an output fiber which have the same wavelength. In stage 503 the demultiplexed channels are combined using combiners or multiplexers into groups of channels. These groups may include a single channel or a subset of the total number of channels. The effect of stages 501 to 503 is to partially demultiplex groups of channels on the input fibers 101, 102 into individual channels and new groups of channels. This is achieved by a complete demultiplexing step in stage 501 followed by a partial recombining step in stage 503. This is to be contrasted with the previous embodiments in which the partial demultiplexing step to select individual channels was done by splitting and filtering. In stage 504 the grouped channels are fed to parallely arranged 2×2 space switches 55 which switch all the wavelengths of one group on one input fiber 101, 102 towards output fibers 201, 202 if more than half of the channels of an input fiber 101, 102 must be switched towards a particular output fiber 202, 201. Finally, in step 505, the switched groups are combined in combiners or multiplexers 56 onto the output fibers 201, 202.

This embodiment makes use of the steps of demultiplexing, grouping, group switching and recombining in order to be able to switch any channel from an input fiber 101, 102 to any output fiber 201, 202. The group switching is done in parallel space switches 55. If there are more than two (2) input fibers then for Ni input fibers and Nc channels per fiber group switching is carried out if more than Ni/Nc channels are to be switched to another ouptut fiber.

Additional aspects of the present invention are:

Aspect 1. A cross-connect device with $N_f$ first input fibers and $N_f$ first output fibers, being able to switch $N_f * N_1$ channels, $N_f * N_1$ being equal or greater than four (4), the channels being equally distributed over the first input fibers comprising:
  a switch, having as input fibers the $N_f$ first input fibers, and $N_f$, second output fibers, the switch switching for each of the first input fibers all channels to one of the second output fibers;
  $N_f$ splitters, each having as second input fiber one (1) of the second output fibers and a plurality of third output fibers;
  a selecting and switching device with $N_f$ third input fibers and $N_f$ fourth output fibers, being able to switch a first number of channels, the first number being strictly smaller than $N_f * N_1$, the selecting and switching device switching a subset of the channels of the second output fibers;
  a plurality of filters, part of the filters having as a fourth input fiber one (1) of the third output fibers, and one (1) fifth output fiber; and
  a plurality of combiners, each having a plurality of fifth input fibers and 25 having as output fiber one (1) of the first output fibers, each of the combiners combining a subset of the third output fibers with one (1) of the fourth output fibers.

Aspect 2. The cross-connect device according to Aspect 1, wherein a number D is the smallest integer larger than or equal to $N_1/2(N_f-1)$, a number E is a non-zero integer smaller or equal to D, and the first number is equal or larger than $N_f *(N_1-E)$.

Aspect 3. The cross-connect device according to Aspect 2, wherein the splitters have E+1 output fibers, the combiners have E+1 input fibers and the number of filters in the plurality of filters equals $N_f*E$.

Aspect 4. The cross-connect device according to Aspect 3, wherein each of the second output fibers is connected to one (1) of the second input fibers;
  each of the third input fibers is connected to one (1) of the third output fibers, the third input fibers not being connected to the same splitter; and each of the fourth input fibers is connected to one (1) of the third output fibers.

Aspect 5. The cross-connect device according to Aspect 4, wherein each of the fourth output fibers is connected to one (1) of the fifth input fibers, the fourth output fibers not being connected to the same combiner; and
each of the fifth output fibers is connected to one (1) of the fifth input fibers.

Aspect 6. The cross-connect device according to Aspect 5, wherein the selecting and switching device is configured in such a way that it has essentially the same functionality and structure as the cross-connect device.

Aspect 7. A cross-connect device with two (2) first input fibers and two (2) first output fibers, being able to switch a first even amount of channels, the first amount being equal or greater than four (4), the channels being equally distributed over the two (2) input fibers comprising of:
a switch, having as input fibers the first input fibers, and two (2) second output fibers, the switch switching for each of the first input fibers all channels to one (1) of the second output fibers;
two (2) splitters, each having as second input one (1) of the second output fibers, and a plurality of third output fibers;
a selecting and switching device with two (2) third input fibers and two (2) fourth output fibers, and being able to switch a second even amount of channels, the second even amount of channels being equal or larger than half of the first even amount of channels, the switching and selecting device switching a subset of the channels of the second output fibers;
a plurality of filters, part of the filters having as fourth input fiber one (1) of the third output fibers, and one (1) fifth output fiber; and
two (2) combiners, each having a plurality of fifth input fibers and having as output fiber one (1) of the first output fibers, each of the combiners combining a subset of the third output fibers with one (1) of the fourth output fibers.

Aspect 8. The cross-connect device according to Aspect 7, wherein the first even amount of channels equals $2^N+2*M$ where N is an integer strictly greater than 1, 2*M is an integer larger or equal to zero and strictly smaller than $2^N$, with M an integer, a first number A being the largest integer smaller than $2^{(N-2)}+M/2$, a second number B being an integer larger or equal to the first number A and strictly smaller than $2^{(N-1)}+M$ and the second even amount of channels being 2*B.

Aspect 9. The cross-connect device according to Aspect 8, wherein a third number C is the difference between $2^{(N-1)}+M$ and the second number B, the splitters have C+1 output fibers, the combiners have C+1 input fibers and the number of filters in the plurality of filters is 2*C.

Aspect 10. The cross-connect device according to Aspect 9, wherein each of the second output fibers is connected to one (1) of the second input fibers;
each of the third input fibers is connected to one (1) of the fifth output fibers, the third input fibers not being connected to the same splitter; and
each of the fourth input fibers is connected to one (1) of the third output fibers.

Aspect 11. The cross-connect device according to Aspect 10, wherein each of the fourth output fibers is connected to one (1) of the fifth input fibers, the fifth output fibers never being connected to the same combiner; and
each of the fifth output fibers is connected to one (1) of the fifth input fibers.

Aspect 12. The cross-connect device according to Aspect 11, wherein the selecting and switching device are configured such that they have essentially the same functionality and structure as the cross-connect device, except for final switching and selecting device which is able to switch a predetermined amount of channels, the amount being an even integer strictly greater than one (1).

Aspect 13. The cross-connect device according to Aspect 12, wherein the predetermined amount of channels is equal to two (2);
the second selecting and switching device with two (2) first input fibers and two (2) first output fibers comprises:
a switch having as outputs the first output fibers and two (2) second input fibers;
two filters, each having as input fiber one (1) of the first input fibers and one (1) second output fiber; and
each of the second input fibers being connected to one (1) of the second output fibers.

Aspect 14. The cross-connect device according to Aspect 12, wherein the predetermined amount of channels is equal to two (2);
the second selecting and switching device with two (2) first input fibers and two (2) first output fibers comprises:
a switch having as inputs the first input fibers and two (2) second output fibers;
two filters, each having as output fibers one (1) of the first output fibers and one (1) second input fiber; and
each of the second input fibers being connected to one (1) of the second output fibers.

Aspect 15. The cross-connect device according to Aspect 14, where the cross-connect device is indicated in a photonic integrated circuit.

Aspect 16. The cross-connect device according to Aspect 12, wherein the filters are tuneable.

Aspect 17. The cross-connect device according to Aspect 12, wherein the filters are non-tuneable.

Aspect 18. The cross-connect device according to Aspect 12, wherein each of the filters comprises a cascade of a tunable filter and a wavelength convertor.

Aspect 19. The cross-connect device according to Aspect 12, where one half of the filters comprise cascades of a tunable filter and a wavelength convertor and the other half of the filters are tunable.

Aspect 20. A method for switching $N_f * N_1$ channels being equally distributed over $N_f$ input fibers to $N_f * N_1$ channels being equally distributed over $N_f$ output fibers, comprising the steps of:
defining a set of $N_f$ intermediate fibers of a first kind;
defining a set of $N_f$ intermediate fibers of a second kind;
switching for each of the input fibers the channels to one (1) of the first intermediate fibers of a first kind, thereby not switching channels of different input fibers to the same intermediate fiber of a first kind; and thereafter
applying a method for switching an amount of channels being equally distributed over the intermediate fibers of a first kind to the intermediate fibers of a second kind.

Aspect 21. The method according to Aspect 20, wherein the number of channels of the intermediate fibers of a first kind is determined by splitting the intermediate fibers of a first kind into a plurality of intermediate fibers of a third kind.

Aspect 22. The method according to Aspect 21, where each of the output fibers at least comprises the channels of one of the intermediate fibers of a second kind.

Aspect 23. The method according to Aspect 22, wherein the method for switching an amount of channels is applied to the channels of $N_f$ intermediate fibers of a third kind.

Aspect 24. A method for switching a first even amount of channels being equally distributed over a first and a second input fiber to a first even amount of channels being equally distributed over a first and second output fiber, comprising the steps of:
  defining a first and a second intermediate fiber of a first kind;
  defining a first and a second intermediate fiber of a second kind;
  switching all the channels of the first input fiber to the first intermediate fiber of a first kind and all the channels of the second input fiber to the second intermediate fiber of a first kind when less or equal than half of the channels of the first input fiber must be switched to the first output fiber;
  switching all the channels of the first input fiber to the second intermediate fiber of a first kind and all the channels of the second input fiber to the second intermediate fiber of a second kind when more than half of the channels of the first input fiber must be switched to the second output fiber; thereafter
  applying a method for switching a second amount of channels being equally distributed over the first and the second intermediate fibers of a first kind to the first and the second intermediate fibers of a second kind, the second amount being at least half of the first amount.

Aspect 25. The method according to Aspect 24, wherein the second amount of channels of the first and the second intermediate fibers of a first kind are determined by splitting the first intermediate fiber of a first kind in a plurality of intermediate fibers of a third kind and the second intermediate fiber of a first kind in a plurality of intermediate fibers of a fourth kind.

Aspect 26. The method according to Aspect 25, wherein the amount of channels of the first output fiber at least comprises all channels on the first intermediate fiber of a second kind and the amount of channels on the second output fiber at least comprises of all channels on the second intermediate fiber of a second kind.

Aspect 27. The method according to Aspect 26, wherein the method for switching a second amount of channels is applied to the channels of one (1) of the intermediate fibers of a third kind and to the channels of one (1) of the intermediate fibers of a fourth kind.

Aspect 28. The method according to Aspect 27, wherein the amount of channels on the first output fiber further comprises the channels on the intermediate fibers of a third kind, except that fiber of a third kind which channels being switched by the method for switching a second amount of channels and the amount of channels on the second output fiber further comprises the channels on the intermediate fibers of a fourth kind, except that fiber of a fourth kind which channels being switched by the method for switching a second amount of channels.

Aspect 29. The method according to Aspect 28, wherein at least one (1) of the intermediate fibers of a third kind is filtered and at least one of the intermediate fibers of a fourth kind is filtered.

Aspect 30. The method according to Aspect 29, wherein the first and the second intermediate output fibers of a second kind are filtered.

Aspect 31. A cross-connect device of a first kind with $N_f$ input fibers and output fibers, each input fiber carrying $N_f$ channels comprising:
  a plurality of cross-connect devices of a second kind, each of the cross-connect devices of a second kind having an amount of input fibers and output fibers strictly less than the cross-connect device of a first kind; and
  at least one (1) of the cross-connect devices of a second kind at least comprising:
    a plurality of switches; and
    a selecting and switching component, with an amount of input fibers and output fibers equal to the amount of input fibers and output fibers of the cross-connect device of a second kind to which the selecting and switching component belongs and the selecting and switching component, being able to switch an amount of channels equal to the amount of input fibers of the selecting and switching component multiplied with a number strictly less than $N_1$.

Aspect 32. The device according to Aspect 31, wherein each of the input fibers of the cross-connect device of a first kind is combined at least once by using the cross-connect devices of a second kind.

Aspect 33. A method for switching $N_f * N_1$ channels being equally distributed over $N_f$ input fibers to $N_f * N_1$ channels being equally distributed over $N_f$, output fibers, comprising the steps of:
  a finite sequence of space switching steps; and thereafter
  a switching and selecting step, for switching an amount of channels equal to $N_f$ multiplied with a number strictly less than $N_1$.

The corresponding structures, materials, acts, and equivalents of all means or step plus function elements in the claims below are intended to include any structure, material, or act for performing the function in combination with other claimed elements as specifically claimed.

What is claimed is:

1. A cross-connect switching device with $N_f$ input lines and $N_f$ output lines and $N_1$ channels per line and being able to switch any of the $N_f * N_1$ input channels to any one of the output lines, $N_f * N_1$ being equal or greater than four (4), and the channels being equally distributed over the input lines, comprising:
  a switch being operatively connected to selected ones of the input lines of the cross-connects switching device and being adapted to switch at least one channel group on one input line of the switch en bloc to an output line of the switch, a channel group including a plurality of channels up to a maximum of $N_1$ channels;
  a partial demultiplexer operatively connected to the switch for selecting at least one individual channel from at least one channel group, wherein the partial demultiplexer is adapted to generate a further channel group as well as the one selected individual channel, further comprising another switch located between the partial demultiplexer and a combiner unit and receiving the output of the partial demultiplexer and being adapted to switch the further channel group en bloc towards one of the output lines of the cross-connect switching device; and the combiner unit for combining the selected individual channel onto an output line of the cross-connect switching device.

2. The cross-connect switching device according to claim 1 wherein the partial demultiplexer includes a splitting device having one input line and adapted for duplicating the channels on its input line onto a plurality of its output lines, and a selecting device for selecting the individual channel.

3. The cross-connect switching device according to claim 2, wherein the selecting device comprises a filter.

4. The cross-connect switching device according to claim 1, wherein the partial demultiplexer includes a splitting device having one input line and adapted for duplicating the channels on its input line onto a plurality of its output lines, and a selecting device for selecting the individual channel.

5. The cross-connect switching device according to claim 4, wherein the selecting device comprises a filter.

6. The cross-connect switching device according to claim 5, wherein the filter is a tuneable filter.

7. The cross-connect switching device of claim 1, wherein the cross-connect device is an optical cross-connect switching device.

8. A cross-connect switching device with $N_f$ input lines and $N_f$ output lines and $N_1$ channels per line and being able to switch any of the $N_f * N_1$ input channels to any one of the output lines, $N_f * N_1$ being equal or greater than four (4), and the channels being equally distributed over the input lines, comprising:

a switch being operatively connected to selected ones of the input lines of the cross-connect switching device and being adapted to switch at least one channel group on one input line of the switch en bloc to an output line of the switch, a channel group including a plurality of channels up to a maximum of $N_1$ channels, wherein the switch has $N_f$ input lines with Nc channels per line and the switch is adapted to switch the group of Nc channels per input line to an output line of the switch if more than Nc/$N_f$ channels of the input channels per line are to be switched to the particular switch output line;

a partial demultiplexer operatively connected to the switch for selecting at least one individual channel from at least one channel group; and a combiner unit for combining the selected individual channel onto an output line of the cross-connect switching device.

9. The cross-connect switching device according to claim 8 wherein the partial demultiplexer includes a splitting device having one input line and adapted for duplicating the channels on its input line onto a plurality of its output lines, and a selecting device for selecting the individual channel.

10. The cross-connect switching device according to claim 9, wherein the selecting device comprises a filter.

11. The cross-connect switching according to claim 8 wherein the cross-connect device is an optical cross-connect switching device.

12. The cross-connect switching device according to claim 8, wherein the partial demultiplexer includes a splitting device having one input line and adapted for duplicating the channels on its input line onto a plurality of its output lines, and a selecting device for selecting the individual channel.

13. The cross-connect switching device according to claim 12, wherein the selecting device comprises a filter.

14. The cross-connect switching device according to claim 13, wherein the filter is a tuneable filter.

15. The cross-connect switching device of claim 8, wherein the cross-connect device is an optical cross-connect switching device.

16. A cross-connect switching device with $N_f$ input lines and $N_f$ output lines and $N_1$ channels per line, and being able to switch any of the $N_f * N_1$ input channels to one of the output lines, $N_f * N_1$ being equal or greater than four (4), and the channels being equally distributed over the input lines, comprising:

a partial demultiplexer operatively connected to at least some of the input lines of the cross-connect switching device for partial demultiplexing the channels on an input line of the partial demultiplexer into at least a group of channels and an individual channel, a channel group including a plurality of channels up to a maximum of $N_1$ channels;

a switch operatively connected to the output side of the partial demultiplexer, the switch being adapted to switch the at least one channel group en bloc to an output line of the switch, wherein the switch has $N_f$ input lines with Nc channels per line and the switch is adapted to switch the group of Nc channels per input line to an output line of the switch if more than Nc/$N_f$ channels of the input channels per line are to be switched to the particular switch output line; and a combiner unit for combining the individual channel onto an output line of the cross-connect switching device.

17. The cross-connect switching device of claim 16, wherein the cross-connect device is an optical cross-connect switching device.

18. The cross-connect switching device according to claim 16, wherein the switch has $N_f$ second output lines and the $N_f$ first input lines as input lines, and the switch switches for each of the first input lines all channels to one of the second output lines, and the partial demultiplexer comprises:

$N_f$ splitters, each having as second input line one of the second output lines and a plurality of third output lines;

a plurality of filters, part of the filters having as fourth input line one of the third output lines, and one fifth output line;

a selecting and switching unit with $N_f$ third input lines and $N_f$ fourth output line which is able to switch a first number of channels, the first number being strictly smaller than $N_f * N_1$ the selecting and switching unit switching a subset of the channels of the second output lines; and the combiner unit comprises:

a plurality of combiners, each having a plurality of fifth input lines and having as output line one of the first output lines, each of the combiners combining channels on a subset of the third output lines onto one of the fourth output lines.

19. A cross-connect switching device with $N_f$ input lines and $N_f$ output lines and $N_1$ channels per line, and being able to switch any of the $N_f * N_1$ input channels to one of the output lines, $N_f * N_1$ being equal or greater than four (4), and the channels being equally distributed over the input lines, comprising:

a partial demultiplexer operatively connected to at least some of the input lines of the cross-connect switching device for partial demultiplexing the channels on an input line of the partial demultiplexer into at least a group of channels and an individual channel, a channel group including a plurality of channels up to a maximum of $N_1$ channels, wherein the partial demultiplexer includes a splitting device having one input line and adapted for duplicating the channels on its input line onto a plurality of its output lines, and a selecting device for selecting the individual channel;

a switch operatively connected to the output side of the partial demultiplexer, the switch being adapted to switch the at least one channel group en bloc to an output line of the switch; and a combiner unit for combining the individual channel onto an output line of the cross-connect switching device.

20. The cross-connect switching device of claim 19, wherein the cross-connect device is an optical cross-connect switching device.

21. The cross-connect switching device according to claim 19, wherein the selecting device comprises a filter.

22. The cross-connect switching device according to claim 19, wherein the switch has $N_f$ second output lines and the $N_f$ first input lines as input lines, and the switch switches for each of the first input lines all channels to one of the second output lines, and the partial demultiplexer comprises:

$N_f$ splitters, each having as second input line one of the second output lines and a plurality of third output lines;

a plurality of filters, part of the filters having as fourth input line one of the third output lines, and one fifth output line;

a selecting and switching unit with $N_f$ third input lines and $N_f$ fourth output line which is able to switch a first number of channels, the first number being strictly smaller than $N_f * N_1$ the selecting and switching unit switching a subset of the channels of the second output lines; and the combiner unit comprises:

a plurality of combiners, each having a plurality of fifth input lines and having as output line one of the first output lines, each of the combiners combining channels on a subset of the third output lines onto one of the fourth output lines.

23. A cross-connect switching device with $N_f$ input lines and $N_f$ output lines and $N_1$ channels per line and being able to switch any of the $N_f * N_1$ input channels to any one of the output lines, $N_f * N_1$ being equal or greater than four (4), and the channels being equally distributed over the input lines, comprising:

a switch being operatively connected to selected ones of the input lines of the cross-connect switching device and being adapted to switch at least one channel group on one input line of the switch en bloc to an output line of the switch, a channel group including a plurality of channels up to a maximum of $N_1$ channels, wherein the switch, has $N_f$ second output lines and the $N_f$ first input lines as input lines, and the switch switches for each of the first input lines all channels to one of the second output;

a partial demultiplexer operatively connected to the switch for selecting at least one individual channel from at least one channel group, the partial demultiplexer comprises:

$N_f$ splitters, each having as second input line one of the second output lines and a plurality of third output lines;

a plurality of filters, part of the filters having as fourth input line one of the third output lines, and one fifth output line;

a selecting and switching unit with $N_f$ third input lines and $N_f$ fourth output line which is able to switch a first number of channels, the first number being strictly smaller than $N_f * N_1$ the selecting and switching unit switching a subset of the channels of the second output lines; and a combiner unit for combining the selected individual channel onto an output line of the cross-connect switching device, the combiner unit comprises:

a plurality of combiners, each having a plurality of fifth input lines and having as output line one of the first output lines, each of the combiners combining channels on a subset of the third output lines onto one of the fourth output lines.

24. A first cross-connect switching device with $N_f$ input lines and $N_f$ output lines, each input line carrying $N_1$ channels, comprising:

a plurality of second cross-connect switching devices, each of the second cross-connect devices having a number of input lines and output lines less than the first cross-connect switching device; and at least one of the second cross-connect switching devices comprising:

a plurality of switches; and a selecting and switching unit having a number of input lines and output lines equal to the number of input lines and output lines of the second cross-connect switching device to which the selecting and switching unit belongs and the selecting and switching unit being able to switch a number of channels equal to the number of input lines of the selecting and switching unit multiplied by a number less than $N_1$.

25. The cross-connect switching device according to claim 24 wherein said second cross-connect switching device is a cross-connect switching device with $N_f$ input lines and $N_f$ output lines and $N_1$ channels per line and being able to switch any of the $N_f * N_1$) input channels to any one of the output lines, $N_f * N_1$ being equal or greater than four (4), and the channels being equally distributed over the input lines, comprising:

a switch being operatively connected to selected ones of the input lines of the cross-connect switching device and being adapted to switch at least one channel group on one input line of the switch en bloc to an output line of the switch, a channel group including a plurality of channels up to a maximum of $N_1$ channels;

a partial demultiplexer operatively connected to the switch for selecting at least one individual channel from at least one channel group; and a combiner unit for combining the selected individual channel onto an output line of the cross-connect switching device.

26. The cross-connect switching device according to claim 24 wherein said second cross-connect switching device is a cross-connect switching device with $N_f$ input lines and $N_f$ output lines and $N_1$ channels per line, and being able to switch any of the $N_f * N_1$ input channels to one of the output lines, $N_f * N_1$ being equal or greater than four (4), and the channels being equally distributed over the input lines, comprising:

a partial demultiplexer operatively connected to at least some of the input lines of the cross-connect switching device for partial demultiplexing the channels on an input line of the partial demultiplexer into at least a group of channels and an individual channel, a channel group including a plurality of channels up to a maximum of $N_1$ channels;

a switch operatively connected to the output side of the partial demultiplexer, the switch being adapted to switch the at least one channel group en bloc to an output line of the switch; and a combiner unit for combining the individual channel onto an output line of the cross-connect switching device.

27. A method for switching $N_f * N_1$ channels, being equally distributed over $N_f$ input lines, to $N_f * N_1$ channels, equally distributed over $N_f$ output lines, there being $N_1$ channels per line, the method comprising the steps of:
   a) performing at least one switching operation in which at least one channel group is switched en bloc towards one of the output lines, a channel group including a plurality of channels up to a maximum of $N_1$ channels;
   b) partially demultiplexing to select at least one individual channel from at least one group, and
   c) combining the selected individual channel onto an output line, wherein there are $N_f$ channel groups on $N_f$ input lines each having Nc channels per group and a group is switched to an output line in the switching operation if more than Nc/$N_f$ channels of the input channels per line are to be switched to the particular output line.

28. The method according to claims 27 wherein the lines are optical fibers.

29. A method for switching $N_f * N_1$ channels, being equally distributed over $N_f$ input lines, there being $N_f * N_1$ channels equally distributed over $N_f$ output lines, the method comprising the steps of:
   a) partially demultiplexing the channels on an input line into at least one individual channel and at least one group of channels, a channel group including a plurality of channels up to a maximum of $N_1$ channels;
   b) performing at least one switching operation in which the at least one channel group is switched en bloc towards one of the output lines; and
   c) combining the at least one individual channel onto an output line, wherein there are $N_f$ channel groups on $N_f$ input lines each having Nc channels per group and a group is switched to an output line in the switching operation if more than Nc/$N_f$ channels of the input channels per line are to be switched to the particular output line.

30. The method according to claims 29 wherein the lines are optical fibers.

* * * * *

UNITED STATES PATENT AND TRADEMARK OFFICE
CERTIFICATE OF CORRECTION

PATENT NO. : 6,678,473 B1
DATED : January 13, 2004
INVENTOR(S) : Geert Morthier

It is certified that error appears in the above-identified patent and that said Letters Patent is hereby corrected as shown below:

Column 4,
Line 9, replace "build" with -- built --;
Line 16, replace "of" after "accordance," with -- with --;
Line 30, delete "of" after -- cross-connecting --;
Line 41, insert -- a -- after "as";

Column 6,
Line 2, insert -- the -- after "fibers";
Line 3, insert -- a -- after "that";

Column 7,
Line 48, replace "swithing" with -- switching --;

Column 9,
Line 43, insert -- a -- after "be";

Column 10,
Line 25, delete "in" after "that";
Line 47, delete "of" after "comprising";
Line 52, replace "amount" with -- amounts --;
Line 67, replace "an" with -- a --;

Column 13,
Line 11, replace "210" with -- 201 --;

Column 15,
Line 7, replace "splitters" with -- splitter --;
Line 34, replace the second incidence of "23-2" with -- 23-3 --;
Line 43, replace "build" with -- built --;
Line 49, insert -- the -- before "number";

Column 16,
Line 41, replace "build" with -- built --;

Column 18,
Line 65, insert -- is -- after "procedure"; and

UNITED STATES PATENT AND TRADEMARK OFFICE
CERTIFICATE OF CORRECTION

PATENT NO. : 6,678,473 B1
DATED : January 13, 2004
INVENTOR(S) : Geert Morthier

It is certified that error appears in the above-identified patent and that said Letters Patent is hereby corrected as shown below:

Column 23,
Line 50, delete "of" after "comprises".

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,678,473 B1
DATED         : January 13, 2004
INVENTOR(S)   : Geert Morthier It is certified that error appears in the above-identified patent and that said Letters Patent is hereby corrected as shown below:

Column 2,
Line 37, replace "OXC-2,$2^M$)" with -- OXC-(2,$2^M$) --;

Column 8,
Line 27, after "two," replace "$2^{N-1}$ with M=)" with -- ($2^{N-1}$ with M=) --;

Column 12,
Line 36, after "conventional," replace "cross-connects" with -- cross-connect --;

Column 13,
Line 64, replace "fled" with -- fed --; and

Column 14,
Line 42, replace "cross-connects" with -- cross-connect --.

Column 24,
Line 56, replace "cross-connects" with -- cross-connect --.

Signed and Sealed this

Ninth Day of November, 2004

JON W. DUDAS
*Director of the United States Patent and Trademark Office*